(12) United States Patent
Cheng

(10) Patent No.: US 7,649,329 B2
(45) Date of Patent: Jan. 19, 2010

(54) METHOD AND CIRCUIT FOR CONTROLLING MOTOR AND BRUSHLESS MOTOR SYSTEM USING THE SAME

(75) Inventor: Kuang-Yao Cheng, Taipei (TW)

(73) Assignee: Prolific Technology Inc., Taipei (TW)

( * ) Notice: Subject to any disclaimer, the term of this patent is extended or adjusted under 35 U.S.C. 154(b) by 254 days.

(21) Appl. No.: 11/752,305

(22) Filed: May 23, 2007

(65) Prior Publication Data
US 2008/0238349 A1    Oct. 2, 2008

(30) Foreign Application Priority Data
Feb. 13, 2007    (TW) .............................. 96105234 A

(51) Int. Cl.
*H02P 6/06* (2006.01)
(52) U.S. Cl. ..................... 318/400.05; 318/400.01; 318/400.04; 318/700
(58) Field of Classification Search ............... 318/439, 318/700, 400.05, 400.35, 400.04, 400.01
See application file for complete search history.

(56) References Cited

U.S. PATENT DOCUMENTS

| | | | |
|---|---|---|---|
| 5,172,036 A | 12/1992 | Cameron | |
| 5,589,746 A * | 12/1996 | Lewis | 318/400.2 |
| 5,789,895 A | 8/1998 | Lee | |
| 5,838,128 A | 11/1998 | Maiocchi et al. | |
| 5,859,520 A | 1/1999 | Bourgeois et al. | |
| 5,866,998 A | 2/1999 | Menegoli | |
| 5,909,095 A | 6/1999 | Sakti et al. | |
| 6,421,258 B1 * | 7/2002 | Soldavini et al. | 363/56.02 |
| 6,504,328 B1 | 1/2003 | Gontowski, Jr. | |
| 6,534,938 B1 * | 3/2003 | Wu et al. | 318/400.28 |
| 6,570,351 B2 * | 5/2003 | Miyazaki et al. | 318/400.32 |
| 6,577,085 B2 | 6/2003 | Maurice et al. | |
| 6,633,145 B2 | 10/2003 | Shao et al. | |
| 6,639,377 B2 * | 10/2003 | Iwaji et al. | 318/700 |
| 6,879,124 B1 | 4/2005 | Jiang et al. | |
| 7,095,204 B2 * | 8/2006 | Lee et al. | 318/700 |
| 7,122,985 B2 * | 10/2006 | Kikuchi | 318/400.34 |

* cited by examiner

*Primary Examiner*—Bentsu Ro
*Assistant Examiner*—David S Luo
(74) *Attorney, Agent, or Firm*—Jianq Chyun IP Office

(57) ABSTRACT

A method and a circuit for controlling a motor and a brushless motor using the same are provided. The brushless motor includes three phase coils, wherein the first terminals of all the phase coils are coupled to a common node. The method includes following steps: among the above-mentioned three phase coils, when there is no current flowing through the first phase coil of the above-mentioned three phase coils and a current flows from the second terminal of the second coil to the second terminal of the third phase coil, detecting the voltage at the second terminal of the first phase coil to be a first specific voltage; detecting the voltage drop of a DC sensing resistor to be a second specific voltage; and utilizing the first specific voltage, the second specific voltage and the DC voltage supplied to the motor to estimate zero crossing points for controlling the motor.

17 Claims, 22 Drawing Sheets

US 7,649,329 B2

METHOD AND CIRCUIT FOR CONTROLLING MOTOR AND BRUSHLESS MOTOR SYSTEM USING THE SAME

CROSS-REFERENCE TO RELATED APPLICATION

This application claims the priority benefit of Taiwan application serial no. 96105234, filed Feb. 13, 2007. All disclosure of the Taiwan application is incorporated herein by reference.

BACKGROUND OF THE INVENTION

1. Field of the Invention

The present invention generally relates to a technique for controlling a motor, and more particularly, to a method for controlling a motor, a circuit for controlling a motor and a brushless motor system using the method or employing the circuit.

2. Description of Related Art

A variable speed motor has been broadly used in many applications, such as a factory automation system, a ventilating system, an air conditioning system and the like. A conventional variable speed motor is a brushed motor, on which a set of brushes and a commutator are disposed. Over the past century, graphite brushes and a slip ring (commutator) which the graphite brushes come to contact with have been used to achieve the commutation of a brushed motor. However, the above-mentioned brushed motor has many drawbacks, it is cumbersome, accompanied by noise during working and inefficient. Along with the progress of since and technology, a novel brushless motor has been developed; and, the improved design and the rapid development in material technology thereof have most probably benefited from the great advancement, the price thereof has been dramatically reduced. Today, the cost difference between a brushed motor and a brushless motor is 10% only, so that a certain trend has appeared that a brushed motor is gradually replaced by a brushless motor.

FIG. 1 is a structure diagram of a typical brushless motor. Referring to FIG. 1, the motor includes three stator coils 11,12 and 13, a rotor 14 employing permanent magnets, Hall sensors 15,16,17 and a circuit for driving a motor 18, wherein all of a terminal of each the stator coil are coupled together, while another terminals (nodes A, B and C) thereof are respectively coupled to the circuit for driving a motor 18 (via three input terminals A, B and C of the circuit 18). The motor is referred to as a three-phase motor as well. The circuit for driving a motor 18 detects the rotation position of the rotor 14 mainly by Hall sensors 15, 16 and 17 and then drives the three stator coils 11-13 via the nodes A, B and C to control the rotation speed and rotation position of the rotor and the like.

In some circumstances or application structures however, a motor does not allow disposing Hall sensors; for example, the compressor motor of a cooler or a refrigerator is a closed motor, which is required to operate at quite high temperatures. Based on the above-mentioned facts, many developers have made efforts to detect the rotation position of a rotor without using Hall sensors. During spinning of a brushless motor's rotor, since the armature where the rotor is mounted on adopts permanent magnets, a back electromotive force (back-EMF) is produced. FIG. 2 is a diagram showing the circuit for driving a motor 18 in FIG. 1 and the equivalent circuit of the conventional brushless motor of FIG. 1. Referring to FIG. 2, the circuit for driving a motor 18 includes transistor switches S201-S206, while the stator coils 11-13 respectively include an equivalent inductance $L_S$, an equivalent resistor in series connection $R_S$ and a back-EMF voltage source $E_A$, $E_B$ or $E_C$. The circuit for driving a motor 18 respectively controls the on/off state of each of the transistor switches S201-S206 in pulse-width-modulation mode (PWM mode), so as to control the currents $i_a$,$i_b$,$i_c$ of the stator coils 11-13. Each of the switches S201-S206 respectively has a PWM-on state and a PWM-off state.

FIG. 3 is a diagram where ideal current waveforms of the conventional three-phase motor shown by FIG. 1 and the back-EMF waveforms generated during the conventional motor spins are schematically illustrated. Referring to FIG. 2, $i_a$,$i_b$,$i_c$ herein respectively indicate the ideal current waveforms of the currents fed to the nodes A, B and C in FIG. 1, $e_a$,$e_b$,$e_c$ respectively represent the back-EMFs of the stator coils 11-13 and $T_e$ represents motor torque. It can be seen from FIG. 3, in order to keep the torque $T_e$ constant, under the ideal condition the currents $i_a$,$i_b$,$i_c$ should be respectively supplied to the stator coils 11-13 at the 30 electrical degree after the back-EMFs $e_a$,$e_b$,$e_c$ respectively cross the zero voltage. In other words, as long as the zero-crossing points of the back-EMFs $e_a$,$e_b$,$e_c$ are detected, the position of the motor relative to the zero-crossing points or the preferred time point to supply the currents is obtained, so that the switching time point for properly controlling the switches S201-S206 can be determined; but the back-EMFs $e_a$,$e_b$,$e_c$ are unable to be directly measured.

To solve the above-mentioned problem, a scheme was proposed wherein a voltage-dividing circuit is used to measure the PWM voltages of the nodes A, B and C where no current is flowing through and a filter is used to filter the measured PWM voltages, so as to extract the information of the back-EMFs $e_a$,$e_b$,$e_c$. However, it is noted that the scheme by using a voltage-dividing circuit would decay the captured signal. On the other hand, a phase delay of the filter is varied with the motor speed, which makes the detection of a zero-crossing point inaccurate and results in thereby a commutation error of the motor.

References listed below are some patents, in which the conventional methods of controlling a motor without Hall sensors by detecting zero-crossing points to obtain motor positions are given. In the following, the major ideas of the patents [1]-[10] including the drawbacks thereof are briefed. FIG. 4 is a conventional circuit diagram cited from the reference [1]. Referring to FIG. 4, in the patent [1], a clamping circuit 40 coupled to the nodes A, B and C of the stator coils of a motor is used to estimate the voltage at the node B when a current flows from A to C and an upper bridge switch S401 is cut off, the drawback of the method is that a minimum switch closing time is definitely required which limits the application of the method. In the patent [2], an offset compensation circuit is provided to compensate the voltage drop caused by the body-diode in a switch. Although the offset compensation is able to improve the asymmetry of zero-crossing signal. However, the voltage drop of a body-diode varies with the forward current flowing therethough. A compensation of a constant voltage proposed by [2] would cause a commutation phase error. In addition, the disclosed circuit can be used to detect a back-EMF in a PWM-off state only, not in a PWM-on state.

In order to improve the accuracy of detecting a zero-crossing event, several methods and circuits are provided by [3]-[6]. In the patent [3], a comparator is used to override the PWM signal and drives a high-side transistor to conducting state until the zero crossing point is detected. It needs to be aware that the current adjustment ability and the generated ripple component of the motor torque would be affected by overriding the PWM signal. The patent [4] discloses a sampling and holding circuit for sampling back-EMF signals in a PWM-on state and holding the sampled voltage by a capacitor in a PWM-off state. The capacitor herein is discharged through a current source during a PWM-off period, thus, the voltage on the capacitor is substantially increased/decreased with the back-EMF, however, the capacitor and the current source need to be adjusted according to the parameters of a motor. In the patent [5], the current flowing paths of a commutator are modified, wherein an extra power transistor is disposed between a low-side transistor and the grounded terminal. The method by modifying the current flowing paths, however, is not suitable for common applications.

The patent [6] proposes a scheme by estimating the variation between a plurality of different back-EMFs rather than estimating a single back-EMF to advance the signal/noise ratio, wherein the currents of any two phases must be detected in current mode, or the difference between any two phase voltages must be detected in voltage mode, and the application of the method would be limited thereby. The method proposed by the patent [7] is based on a time difference between the previously estimated two zero-crossing times to forecast a next zero-crossing time. However, the method is unable to suit a motor having large speed variations or an asymmetrical motor.

The patent [8] provided a polarity detector for measuring a back-EMF and the patent [9] provided an edge detector for detecting a zero-crossing point are intended to solve the problem that the back-EMF during a conducting period of the body-diode in a switch is unable to be detected. However, it is noted that under some situations, in particular, under a heavy load condition, the polarity of the signal corresponding to a real zero-crossing event and measured by using the method of the patents [8, 9] may not be changed. Referring to the experimental waveforms in FIG. 5, the waveform 501 is the voltage of the node A, the waveform 502 is the current of the node A, the waveform 503 is the waveform detected by the patents [8, 9], and 504, 505 and 506 are respectively indicate voltage variations of the waveform 503. It can be seen from FIG. 5 that the voltages of the waveform 503 at the time points 504 and 506 take a low level, which means a zero-crossing point is detected, respectively; but at the time point 505, the zero-crossing point fails to be measured due to an excessive load so that the waveform 503 still keeps a high level. If a real zero-crossing point fails to be measured by using the above-mentioned schemes of the patents [8, 9], the motor may stop down immediately due to no available commutation, which causes a reverse surge current, burns the pre-stage circuit and puts the motor and the applied system in danger.

The patent [10] provides a method by using a storage unit to record the time history of zero-crossing events, wherein a longest delay time, a middle delay time and a shortest delay time of commutation after a zero-crossing event occurs are recorded to judge whether a commutation sequence advances. The commutation is conducted not at the 30 electrical degrees after a zero-crossing point, but by using a time delay. Therefore, the stored longest, middle and shortest delay time of commutation must be adaptively adjusted according to the motor speed. However, there is no standard to define the longest time and the shortest time; thus, the simplest way to utilize the method provided by the patent [10] is to measure various delay time of commutation in respond to different operation speeds and store the measured time information in the above-mentioned storage unit, which results in cost-wasting a lot.

[01] J. M. Bourgeois, J. M. Charreton, P. Guillemin, and B. Maurice, "Control of a brushless motor," U.S. Pat. No. 5,859,520, STM, Jan. 12, 1999.

[02] J. Shao, D. C. Nolan, K. A. Haughton, and T. L. Hopkins, "Circuit for improved back EMF detection," U.S. Pat. No. 6,633,145, STM, Oct. 14, 2003.

[03] E. C. Lee, "BEMF crossing detection in PWM mode operation for sensorless motor control application," U.S. Pat. No. 5,789,895, STM, Aug. 4, 1998.

[04] R. Sakti and K. K. Chow, "BEMF zero-crossing detection system of a multiple-phase motor," U.S. Pat. No. 5,909,095, STM, Jun. 1, 1999.

[05] P. Menegoli, "Circuit for improving back-EMF detection in pulse-width modulation mode," U.S. Pat. No. 5,866,998, STM, Feb. 2, 1999.

[06] G. Maiocchi and M. Viti, "Reconstruction of BEMF signals for synchronizing the driving of brushless sensorless motors by means of predefined driving signals," U.S. Pat. No. 5,838,128, STM, Nov. 17, 1998.

[07] S. W. Cameron, "Method and apparatus for resynchronizing a moving rotor of a polyphase DC motor," U.S. Pat. No. 5,172,036, STM, Dec. 15, 1992.

[08] W. S. Gontowski, "Sensorless motor driver with BEMF mask extender," U.S. Pat. No. 6,504,328, STM, Jan. 7, 2003.

[09] Q. Jiang and C. Bi, "Method to detect the true zero-crossing points of the phase back EMF for sensorless control of brushless DC motors," U.S. Pat. No. 6,879,124, Apr. 12, 2005.

[10] B. Maurice and J. M. Charreton, "Control of a brushless motor," U.S. Pat. No. 6,577,085, STM, Jun. 10, 2003.

SUMMARY OF THE INVENTION

Accordingly, the present invention is directed to provide a method for controlling a motor, a circuit for controlling a motor and a brushless motor system using the method or employing the circuit. The present invention is able to detect zero-crossing points of motor in a PWM-on state further to control the commutation of the motor and furthermore, as shown by the preferred embodiment of the present invention, to reduce commutation error in association with detecting zero-crossing points of motor in a PWM-on state.

As embodied and broadly described herein, the present invention provides a method for controlling a motor, which includes steps: providing a motor including at least three phase stator coils, wherein each stator coil includes a first terminal and a second terminal and the first terminals of the above-mentioned stator coils are coupled to a common node; providing a first power voltage; providing at least three upper-bridge switches respectively coupled between the second terminal of each stator coil and the first power voltage; providing at least three lower-bridge switches respectively coupled between the second terminal of each stator coil and a first end of an impedance element, wherein a second end of the impedance element is coupled to a second power voltage, and the second power voltage is less than the first power voltage; when no current flows through the first stator coil among the above-mentioned stator coils, the upper-bridge switch coupled by the second terminal of the second stator coil is turned on and the lower-bridge switch coupled by the second terminal of the third stator coil is turned on: detecting the voltage at the second terminal of the first stator coil and defining the detected voltage as a first specific voltage; detecting the voltage drop across both ends of the impedance element and defining the detected voltage drop as a second specific voltage; and estimating zero-crossing points so as to control the motor according to the first power voltage, the first specific voltage and the second specific voltage.

According to the method for controlling a motor provided by a preferred embodiment of the present invention, if the first power voltage, the first specific voltage and the second specific voltage are respectively marked by $V_{dd}$, $V_{open}$ and $V_{idc}$, the above-mentioned step 'estimating zero-crossing points so as to control the motor according to the first power voltage, the first specific voltage and the second specific voltage' includes following sub-steps: respectively reducing $V_{open}$, $V_{dd}$ and $V_{idc}$ in a specific same proportion into three voltages $v_{open}$, $v_{dd}$ and $v_{idc}$; scaling $v_{open}$, $v_{dd}$ and $v_{idc}$ in a proportion of 2:1:1 and mixing the scaled voltages into a back-EMF signal; deciding a first zero-crossing event occurs when the back-EMF signal is greater than a predetermined voltage.

Except the above-mentioned steps, the method for controlling a motor provided by the preferred embodiment of the present invention further includes a step: conducting a proportion operation on the first specific voltage to judge whether a second zero-crossing event occurs, when there is no current flowing through the first stator coil among the above-mentioned stator coils, the upper-bridge switch coupled by the second terminal of the second stator coil is turned off and the lower-bridge switch coupled by the second terminal of the third stator coil is turned on. The above-mentioned step 'conducting a proportion operation on the first specific voltage to judge whether a second zero-crossing event occurs', in a specific embodiment, includes following sub-steps: reducing the first specific voltage in a specific proportion into a back-EMF signal; judging whether the second zero-crossing event occurs when the back-EMF signal is greater than a predetermined voltage. The above-mentioned step 'conducting a proportion operation on the first specific voltage to judge whether a second zero-crossing event occurs', in another specific embodiment, in addition to the above-mentioned sub-steps further includes following sub-steps: judging which of the first zero-crossing event and the second zero-crossing event occurs earlier; taking the earlier occurred zero-crossing event among the first and the second zero-crossing events to control the motor.

A circuit for controlling a motor is provided in the present invention. The motor includes at least three phase stator coils, each stator coil includes a first terminal and a second terminal, the first terminals of the above-mentioned stator coils are coupled to a common node, the second terminal of each of the above-mentioned stator coils is coupled to at least an upper-bridge switch and at least a lower-bridge switch, each of the upper-bridge switches respectively determines whether a power voltage is supplied to one of the above-mentioned stator coils and each lower-bridge switch is coupled to a common voltage via an impedance element. The circuit for controlling a motor includes a selection circuit, a zero-crossing detection unit and a control circuit. The selection circuit is coupled to the second terminals of the above-mentioned stator coils, wherein when the upper-bridge switches or lower-bridge switches coupled by the second terminals of the first phase coil and the second phase coil are switched according to a PWM signal, the voltage at the second terminal of the third phase coil is responded to the output terminal of the selection circuit and taken the voltage of the output terminal of the selection circuit as a first voltage; the zero-crossing detection unit is coupled to the output terminal of the selection circuit, wherein when the upper-bridge switch coupled by the second terminal of the first phase coil is turned on and the lower-bridge switch thereof is turned off, the power voltage and the voltage across the impedance element in the first voltage are removed to obtain a first back-EMF voltage, the first back-EMF voltage is compared with a first reference voltage and a first zero-crossing judgement signal is output; the control circuit judges when the zero-crossing event occurs according to the zero-crossing judgement signal so as to control the motor.

According to the circuit for controlling a motor described in the preferred embodiment of the present invention, the above-mentioned zero-crossing detection unit includes a first zero-crossing detection circuit and a second zero-crossing detection circuit. The first zero-crossing detection circuit is used for removing the power voltage and the voltage across the impedance element in the first voltage to obtain a first back-EMF voltage, comparing the first back-EMF voltage with a first reference voltage and outputting the first zero-crossing judgement signal when the upper-bridge switch coupled by the second terminal of the first phase coil is turned on and the lower-bridge switch thereof is turned off, the second zero-crossing detection circuit is used for taking the first voltage as a second back-EMF voltage, comparing the second back-EMF voltage with a second reference voltage and outputting a second zero-crossing judgement signal when the upper-bridge switch coupled by the second terminal of the first phase coil is turned off.

According to the circuit for controlling a motor described in the preferred embodiment of the present invention, the above-mentioned selection circuit includes a first proportionally voltages-reducing circuit for reducing the voltage at the second terminal of the third stator coil in a predetermined proportion to obtain a first voltage. The first zero-crossing detection circuit includes a second proportionally voltages-reducing circuit and an analog subtracting circuit. The second proportionally voltages-reducing circuit reduces the power voltage in a predetermined proportion and defines the reduced voltage as a second voltage, and reduces the voltage across the impedance element in a predetermined proportion and defines the reduced voltage as a third voltage. The analog subtracting circuit is used for scaling the first voltage, the second voltage and the third voltage in a proportion of 2:1:1, and subtracting the scaled second voltage and the scaled third voltage from the scaled first voltage to obtain a first back-EMF voltage and outputting the first back-EMF voltage.

According to the circuit for controlling a motor described in the preferred embodiment of the present invention, the above-mentioned first zero-crossing detection circuit further includes a reference voltage generator, a comparator and a sampling circuit. The reference voltage generator is used for generating a first reference voltage, wherein when the upper-bridge switch coupled by the second terminal of the first phase coil is turned on, the lower-bridge switch thereof is turned off, the lower-bridge switch of the second phase coil is turned on and there is a current flowing through the third phase coil from the first terminal to the second terminal thereof, then, the first reference voltage is set to be a higher voltage level; further, when the level of the first back-EMF voltage is lower than the higher voltage level, the first reference voltage is set to be a middle voltage level; furthermore, when the level of the first back-EMF voltage is higher than the middle voltage level, the first reference voltage is set to be a lower voltage level. The comparator includes a positive input terminal, a negative input terminal and an output terminal, wherein the positive input terminal receives the first back-EMF voltage, the negative input terminal receives the first reference voltage and the output terminal outputs a comparison voltage. The sampling circuit is coupled to the output terminal of the comparator to receive the comparison voltage and samples the comparison voltage to obtain the first zero-crossing judgement signal when the upper-bridge switch of the first stator coil is turned on.

The present invention provides a brushless motor system, which includes a motor, a plurality of upper-bridge switches, a plurality of lower-bridge switches, an impedance element, a selection circuit, a zero-crossing detection unit and a control circuit. The motor includes at least three phase stator coils, each stator coil includes a first terminal and a second terminal and the first terminals of the above-mentioned stator coils are coupled to a common node. At least an upper-bridge switch is coupled between the second terminal of each stator coil and a power voltage and each upper-bridge switch are respectively used for determining whether the power voltage is supplied to the stator coil coupled thereby. The first terminal of the impedance element is coupled to the common node voltage. At least a lower-bridge switch is coupled between the second terminal of each stator coil and the second terminal of the impedance element. The selection circuit is coupled to the second terminals of the above-mentioned stator coils, wherein when the upper-bridge switch or lower-bridge switch coupled by the second terminal of the first phase coil is switched according to a PWM signal and the lower-bridge switch of the second phase coil is turned on, the voltage at the second terminal of the third phase coil is responded to the output terminal of the selection circuit and taken the voltage of the output terminal of the selection circuit as a first voltage. The zero-crossing detection unit is coupled to the output terminal of the selection circuit, wherein when the upper-bridge switch coupled by the second terminal of the first phase coil is turned on and the lower-bridge switch thereof is turned off, the zero-crossing detection unit removes the power voltage and the voltage across the impedance element in the first voltage to obtain a first back-EMF voltage, compares the first back-EMF voltage with a first reference voltage and outputs thereby a first zero-crossing judgement signal. The control circuit judges when the zero-crossing event occurs according to the zero-crossing judgement signal so as to control the motor.

According to the brushless motor system described in the preferred embodiment of the present invention, the above-mentioned zero-crossing detection unit includes a first zero-crossing detection circuit and a second zero-crossing detection circuit. The first zero-crossing detection circuit is used for removing the power voltage and the voltage across the impedance element in the first voltage to obtain a first back-EMF voltage, comparing the first back-EMF voltage with a first reference voltage and outputting the first zero-crossing judgement signal when the upper-bridge switch coupled by the second terminal of the first phase coil is turned on and the lower-bridge switch thereof is turned off; the second zero-crossing detection circuit is used for taking the first voltage as a second back-EMF voltage, comparing the second back-EMF voltage with a second reference voltage and outputting a second zero-crossing judgement signal when the upper-bridge switch coupled by the second terminal of the first phase coil is turned off.

According to the brushless motor system described in the preferred embodiment of the present invention, the above-mentioned selection circuit includes a first proportionally voltages-reducing circuit for reducing the voltage at the second terminal of the third stator coil in a predetermined proportion to obtain a first voltage. And the first zero-crossing detection circuit includes a second proportionally voltages-reducing circuit and an analog subtracting circuit. The second proportionally voltages-reducing circuit reduces the power voltage in a predetermined proportion and defines the reduced voltage as a second voltage, and reduces the voltage across the impedance element in a predetermined proportion and defines the reduced voltage as a third voltage. The analog subtracting circuit is used for scaling the first voltage, the second voltage and the third voltage in a proportion of 2:1:1, subtracting the scaled second voltage and the scaled third voltage from the scaled first voltage to obtain a first back-EMF voltage and outputting the first back-EMF voltage.

According to the brushless motor system described in the preferred embodiment of the present invention, the above-mentioned first zero-crossing detection circuit further includes a reference voltage generator, a comparator and a sampling circuit. The reference voltage generator is used for generating a first reference voltage, wherein when the upper-bridge switch coupled by the second terminal of the first phase coil is turned on, the lower-bridge switch thereof is turned off, the lower-bridge switch of the second phase coil is turned on and there is a current flowing through the third phase coil from the first terminal to the second terminal thereof, then, the first reference voltage is set to be a higher voltage level; further, when the level of the first back-EMF voltage is lower than the higher voltage level, the first reference voltage is set to be a middle voltage level; furthermore, when the level of the first back-EMF voltage is higher than the middle voltage level, the first reference voltage is set to be a lower voltage level. The comparator includes a positive input terminal, a negative input terminal and an output terminal, wherein the positive input terminal receives the first back-EMF voltage, the negative input terminal receives the first reference voltage and the output terminal outputs a comparison voltage. The sampling circuit is coupled to the output terminal of the comparator to receive the comparison voltage and samples the comparison voltage to obtain the first zero-crossing judgement signal when the upper-bridge switch of the first stator coil is turned on.

Since the present invention adopts a scheme that when there is a current flowing from the second terminal of the second specific coil among the above-mentioned three-phase coils to the second terminal of the specific third and there is no current flowing through the first specific coil, the voltage at the second terminal of the first coil is detected and the detected voltage is defined as a first specific voltage, the voltage drop across a DC sensing resistor is detected and the detected voltage drop is defined as a second specific voltage, following by using the first specific voltage, the second specific voltage and the DC voltage supplied to the motor to estimate zero-crossing points to control the motor, therefore, there is no need of a filter of the prior art and no phase delay problem during detecting zero-crossing points with the present invention. In addition, the circuit provided by the embodiment of the present invention allows detecting zero-crossing points by detecting the non-excited stator coils whenever in a PWM-on state or in a PWM-off state.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
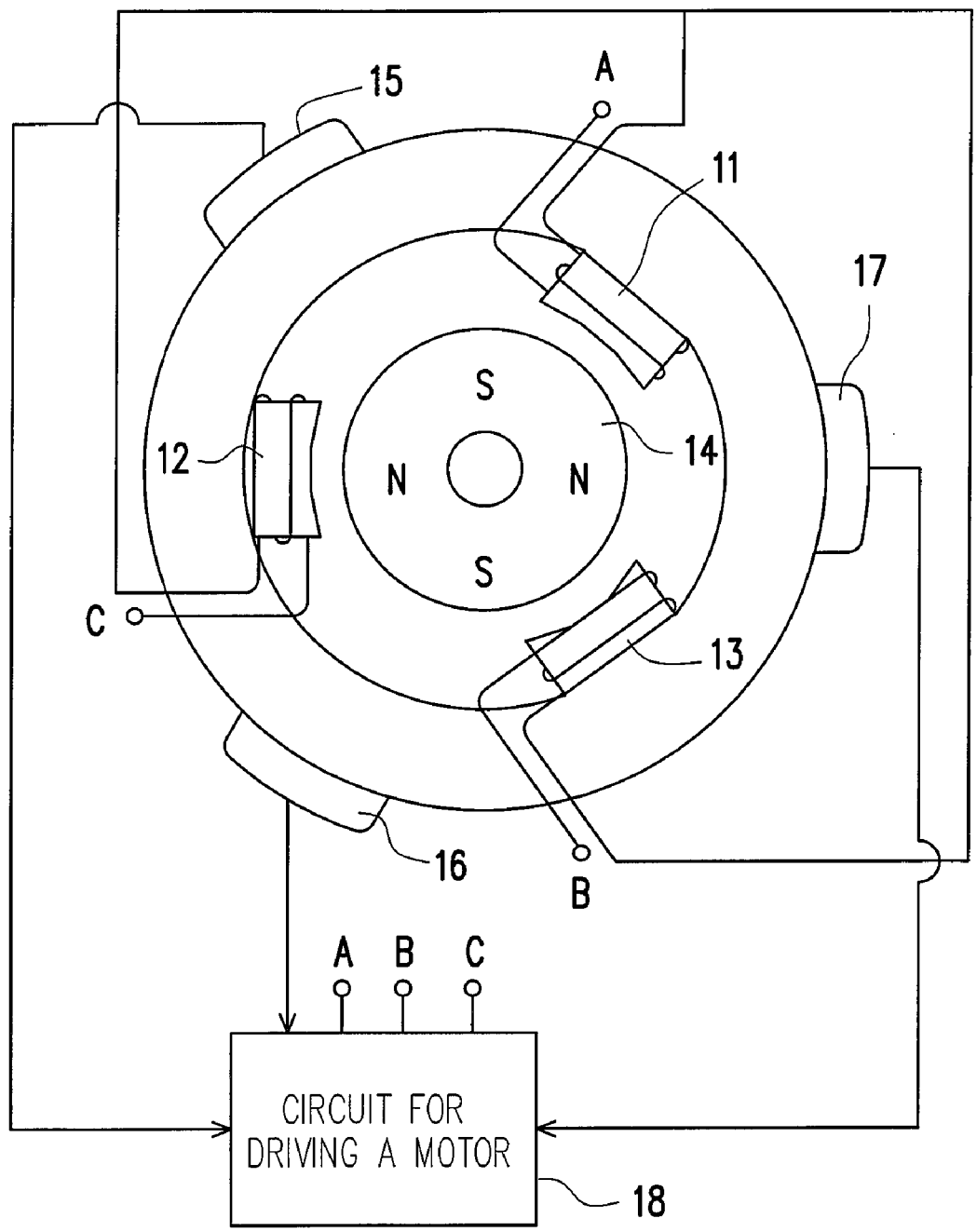
FIG. 1 is a structure diagram of a typical brushless motor.

Reference will now be made in detail to the present preferred embodiments of the invention, examples of which are illustrated in the accompanying drawings. Wherever possible, the same reference numbers are used in the drawings and the description to refer to the same or like parts.

Figure 2:
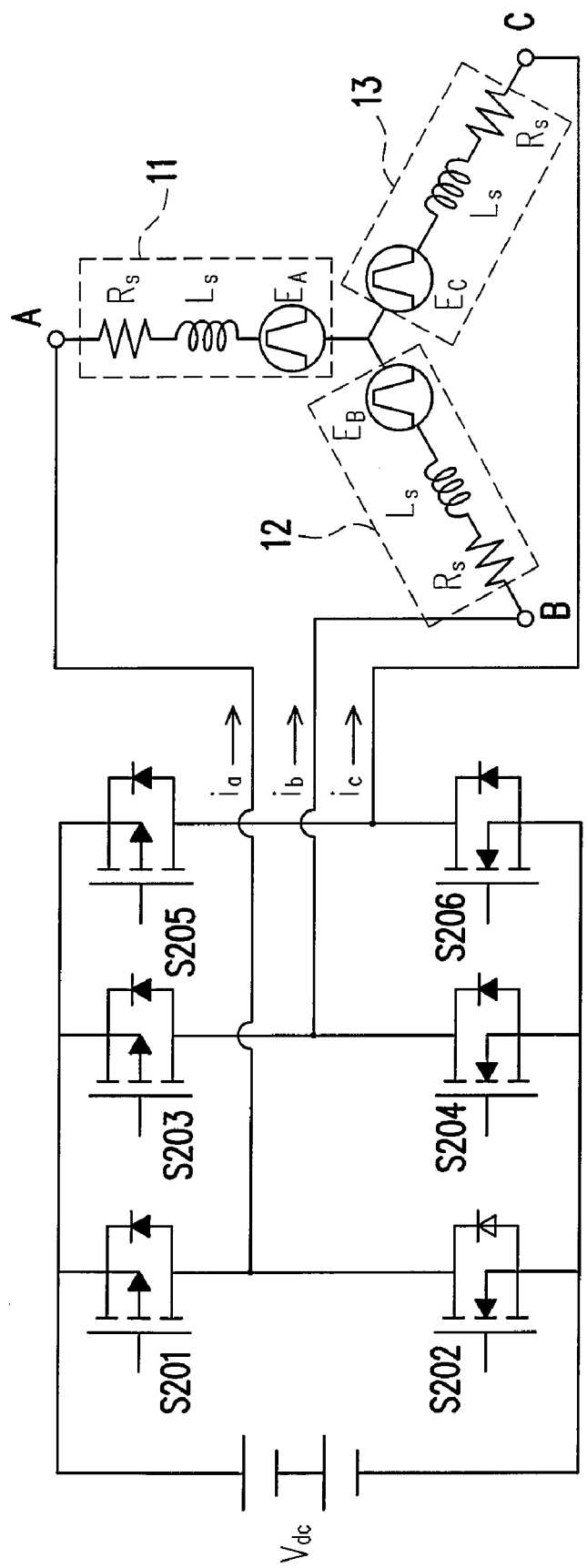
FIG. 2 is a diagram showing the circuit for driving a motor 18 in FIG. 1 and the equivalent circuit of the conventional brushless motor of FIG. 1.
Figure 3:
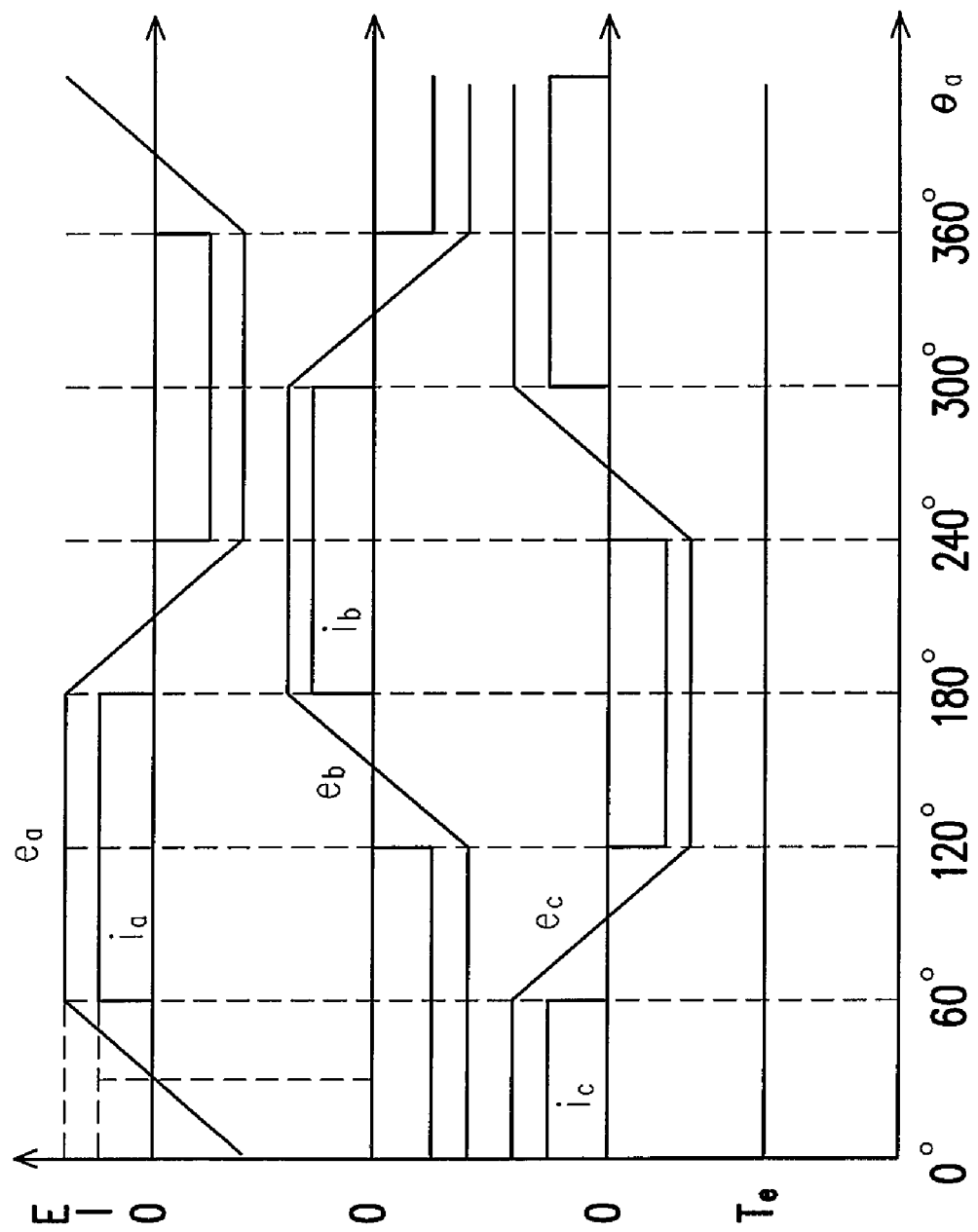
FIG. 3 is a diagram where ideal current waveforms of a conventional three-phase motor and the back-EMF waveforms generated during the conventional motor spins are schematically illustrated.
Figure 4:
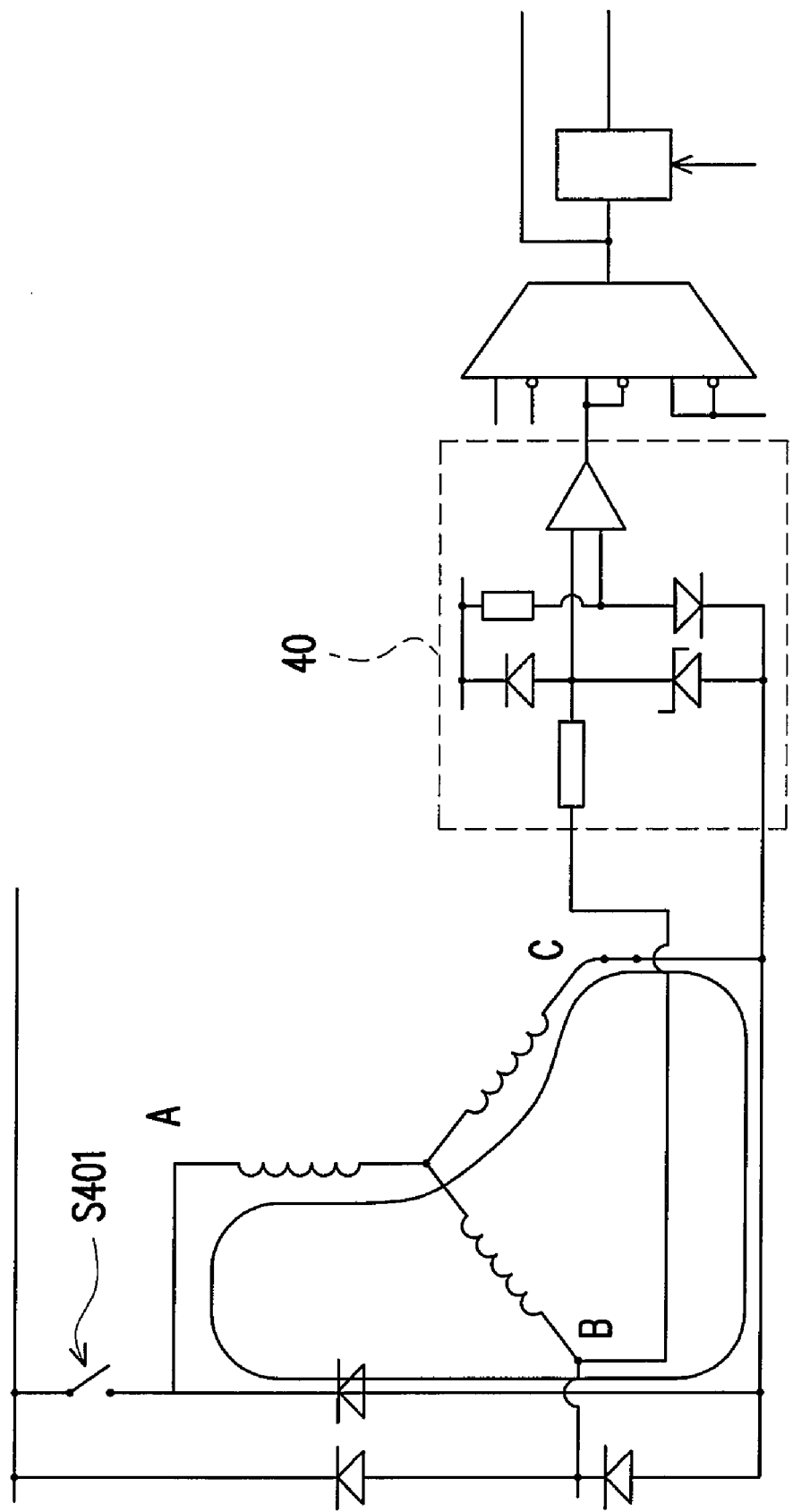
FIG. 4 is a conventional circuit diagram cited from the reference [1].

In order to solve the problem with the prior art, a method for detecting rotor positions, a circuit for controlling a motor and a brushless motor system are provided in the present invention. A brief analysis on a back-EMF which is closely related to a motor position is introduced prior to the depiction of the method and the apparatus. In the following, a three-phase motor shown by FIG. 2 and a brief mathematic/circuit analysis thereof are exemplarily explained.

Assuming the equivalent resistor in series connection $R_S$ of each stator coil 11, 12 or 13 is a constant value and the equivalent inductance $L_S$ of every stator coil is equal to each other, thus, the voltages at nodes A, B and C of the three-phase motor $v_{an}$, $v_{bn}$, $v_{cn}$ can be presented as follows:

$$\begin{bmatrix} v_{an} \\ v_{bn} \\ v_{cn} \end{bmatrix} = \begin{bmatrix} R_s & 0 & 0 \\ 0 & R_s & 0 \\ 0 & 0 & R_s \end{bmatrix} \begin{bmatrix} i_a \\ i_b \\ i_c \end{bmatrix} + \begin{bmatrix} L_s & 0 & 0 \\ 0 & L_s & 0 \\ 0 & 0 & L_s \end{bmatrix} \begin{bmatrix} \frac{di_a}{dt} \\ \frac{di_b}{dt} \\ \frac{di_c}{dt} \end{bmatrix} + \begin{bmatrix} e_a \\ e_b \\ e_c \end{bmatrix}$$

It is also assumed that when a conducting phase is commutated from A+C− to B+C− (where A+C− means a current flows from the node A to the node C and B+C− means a current flows from the node B to the node C), the node A is non-excited and thereby suitable for estimating a back-EMF. Considering the stator coil 11 with characteristic of the equivalent inductance $L_S$, the current flow through the stator coil 11 must keep a continuity, thus, prior to completing a discharge of the inductance of the stator coil 11, i.e., before the current $i_a$ thereof disappears, the voltage at the node A would be clamped in a voltage closed to the grounded level by the body-diode of the switch S202. In other words, prior to completing a discharge of the inductance $L_S$ of the stator coil 11, the node A is unable to be used for estimating a back-EMF. To use the node A for estimating a back-EMF at the time, two periods of time and the features thereof must be considered: a first period of time, i.e., a three-phase conducting duration and a second period of time, i.e., a two-phase conducting duration. So-called a three-phase conducting duration refers to a duration where three phase coils 11-13 have currents flowing therethrough, while a two-phase conducting duration refers to a duration where only two phase coils among 11-13 have currents flowing therethough.

It is also assumed the switches S201, S203 and S205 are high-side switches, while the switches S202, S204 and S206 are low-side switches. During the conducting of A+C−, an operation that the high-side switch S201 is repeatedly switched to control the current flowing from the node A to the node C is termed as high-side switching; an operation that the low-side switch S202 is repeatedly switched to control the current flowing from the node A to the node C is termed as low-side switching; an operation that the high-side switch S201 and the low-side switch S202 are repeatedly switched to control the current flowing from the node A to the node C is termed as complementary switching. In addition, during high-side switching or complementary switching, the on state of a high-side switch is termed as PWM-on state; the off state of a high-side switch is termed as PWM-off state. A brief analysis based on the above-mentioned assumptions on a three-phase conducting duration and a two-phase conducting duration is introduced hereinafter.

Figure 6:
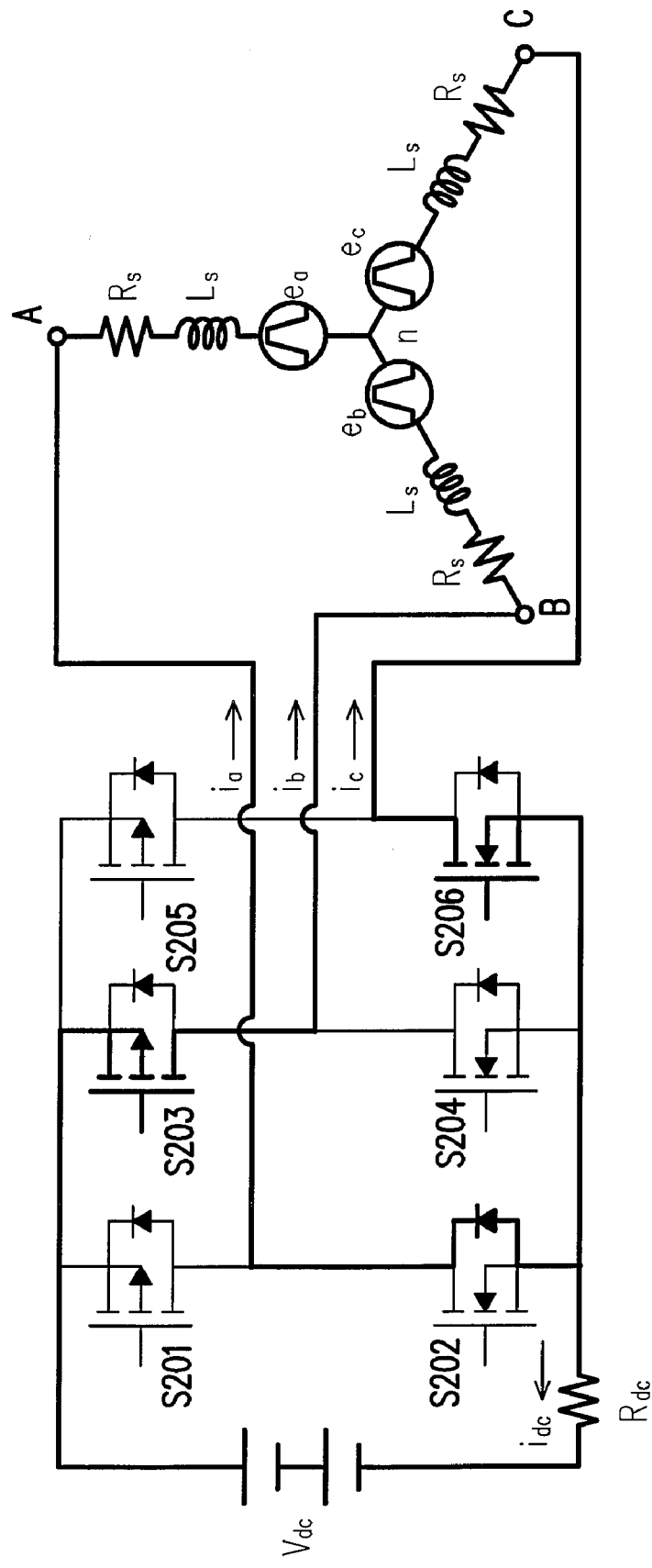
FIG. 6 is a circuit analysis diagram according to the embodiment of the present invention, which is corresponding to a three-phase conducting duration, high-side switching in a PWM-on state and a conducting sequence transition from A+C− to B+C−.

First, an analysis on a three-phase conducting duration with high-side switching is described. FIG. 6 is a circuit analysis diagram according to the embodiment of the present invention, which is corresponding to a three-phase conducting duration, high-side switching in a PWM-on state and the conducting sequence B+C−. Referring to FIG. 6, in a PWM-on state, a current $i_b$ flows from the upper-bridge switch S203 to the node B and further to the node C; a current $i_a$ flows from the body-diode of the lower-bridge switch S202 to the node A and further to the node C. The voltages $v_a, v_b, v_c$ of the nodes A, B and C can be expressed as follows:

$$v_a = i_{dc} R_{dc} - V_d$$

$$v_b = V_{dc} - i_b R_{pon}$$

$$v_c = i_{dc} R_{dc} - i_c R_{non}$$

$$i_{dc} = i_b$$

where $V_d$ is the cut-in voltage of a body-diode, $V_{dc}$ is a DC input voltage, $R_{pon}$ is the conducting resistance of the upper-bridge switches S201, S203 and S205 and $R_{non}$ is the conducting resistance of the lower-bridge switches S202, S204 and S206.

Figure 7:
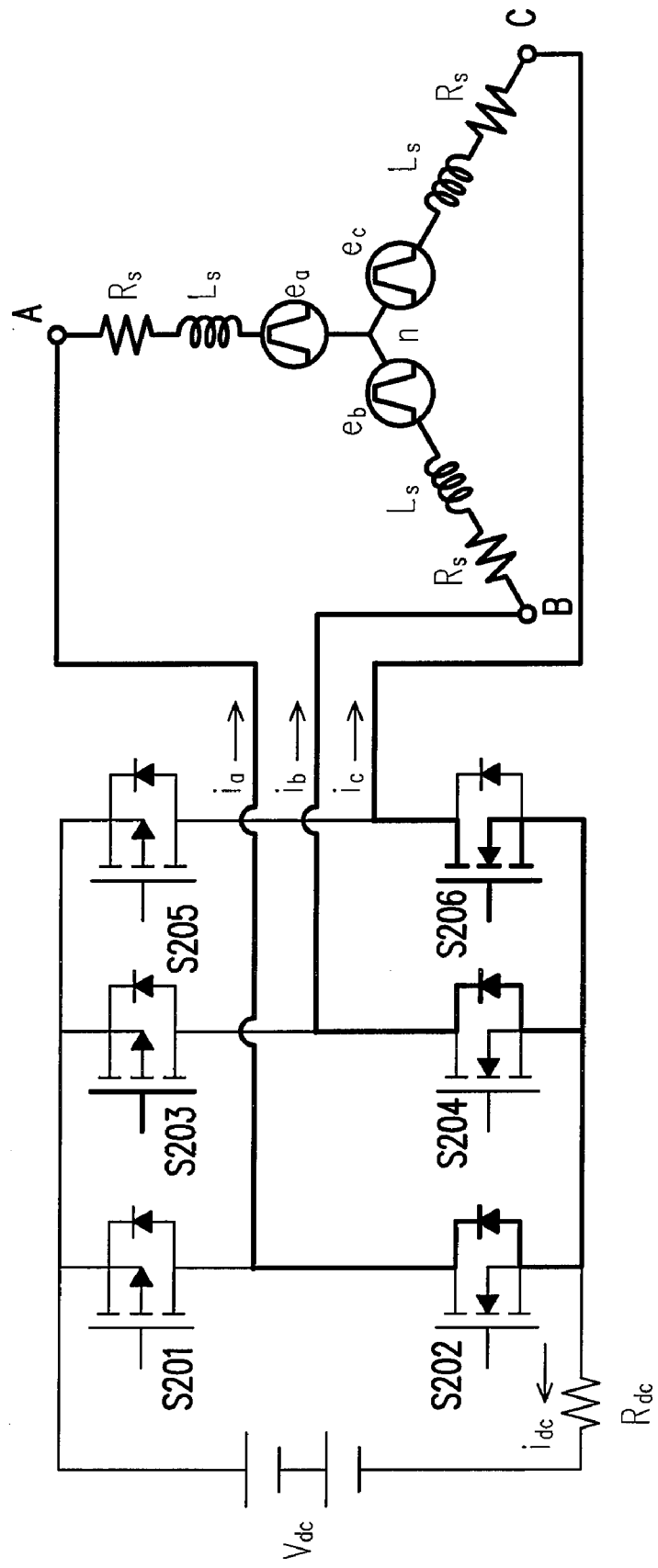
FIG. 7 is a circuit analysis diagram according to the embodiment of the present invention, which is corresponding to a three-phase conducting duration, high-side switching in a PWM-on state and a conducting sequence transition from A+C− to B+C−.

FIG. 7 is a circuit analysis diagram according to the embodiment of the present invention, which is corresponding to a three-phase conducting duration, high-side switching in a PWM-on state and the conducting sequence B+C−. Referring to FIG. 7, in a PWM-on state, a current $i_b$ flows from the lower-bridge switch S204 to the node B and further to the node C; a current $i_a$ flows from the body-diode of the lower-bridge switch S202 to the node A and further to the node C. The voltages $v_a, v_b, v_c$ of the nodes A, B and C can be expressed as follows:

$$v_a = -V_d$$

$$v_b = -V_d$$

$$v_c = -i_c R_{non}$$

$$i_{dc} = 0$$

Figure 8:
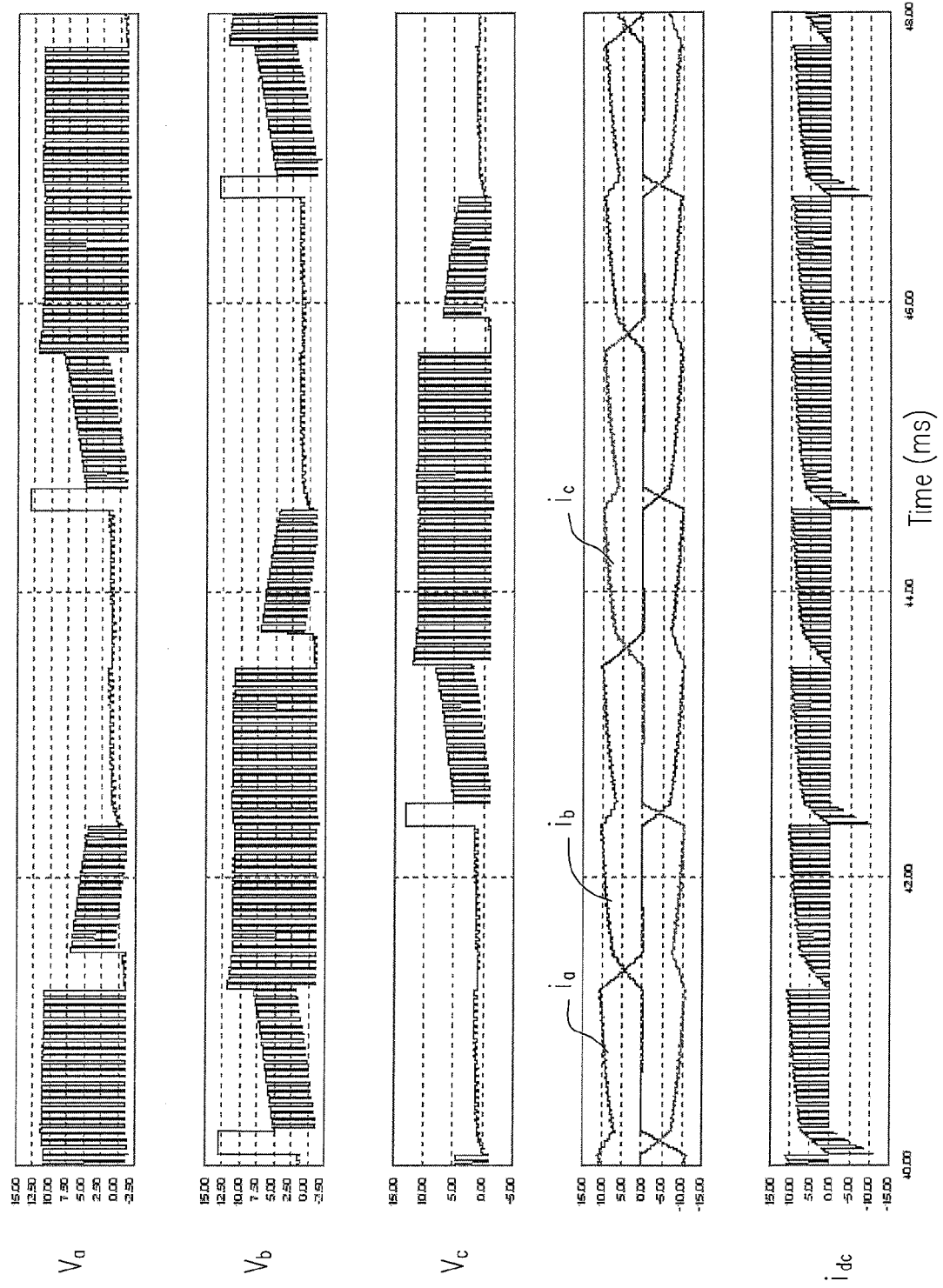
FIG. 8 and FIG. 9 are graphs where the simulation voltages and currents of three-phase stator coils with a high-side switching configuration according to the embodiment of the present invention are given.
Figure 9:
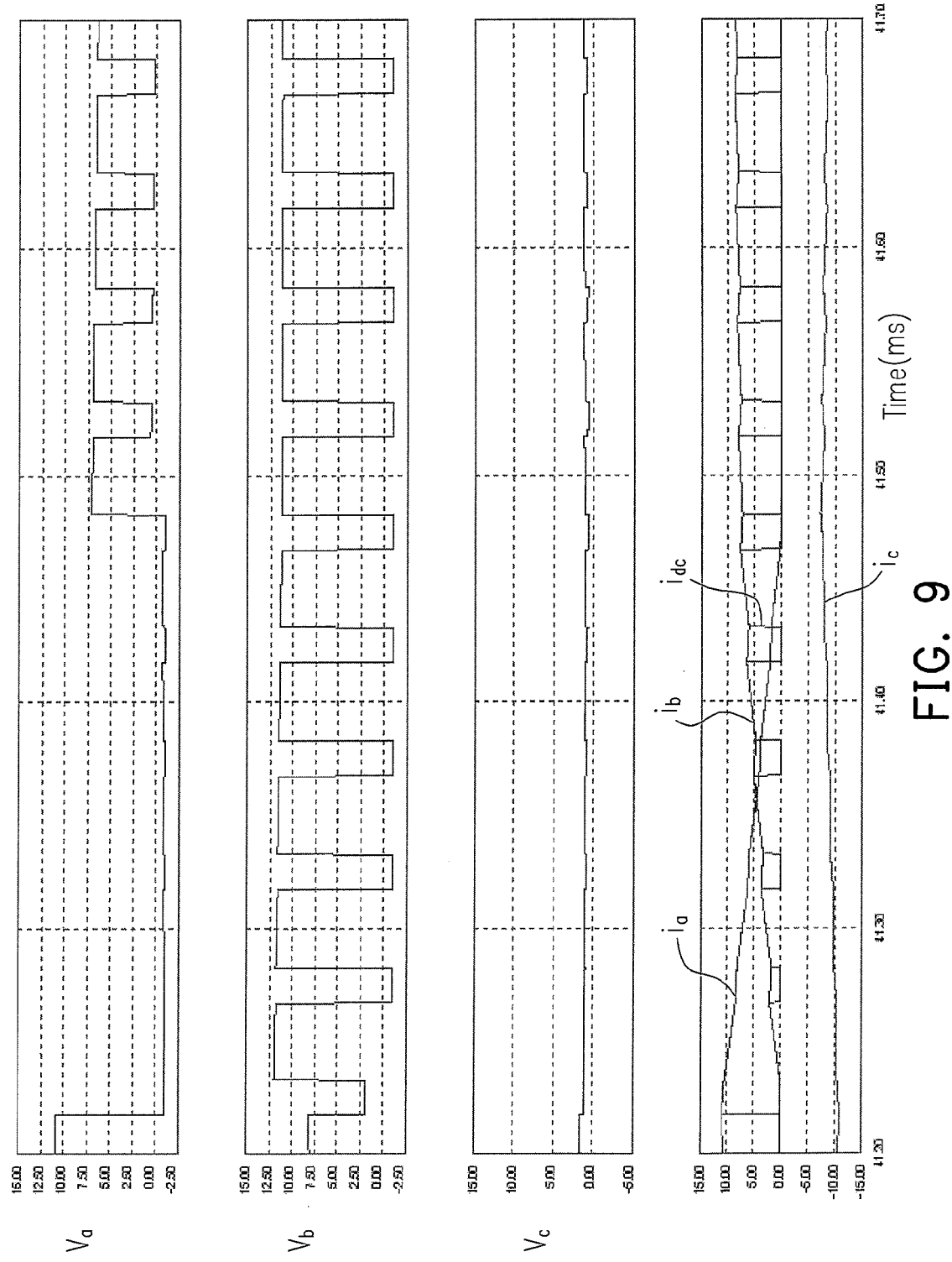

FIG. 8 and FIG. 9 are graphs where the simulation voltages and currents of three-phase stator coils with a high-side switching configuration according to the embodiment of the present invention are given. Referring to FIGS. 8 and 9, since the cut-in voltage of the body-diodes of the switches S201-S206 is set as 1V, the resistance $R_{dc}$ is set as 0.05Ω and the conducting resistances of the switches S201-S206 are set as 0.1 Ω, the voltages and the currents can be estimated by using the above-mentioned equations and illustrated by FIGS. 8 and 9.

Figure 10:
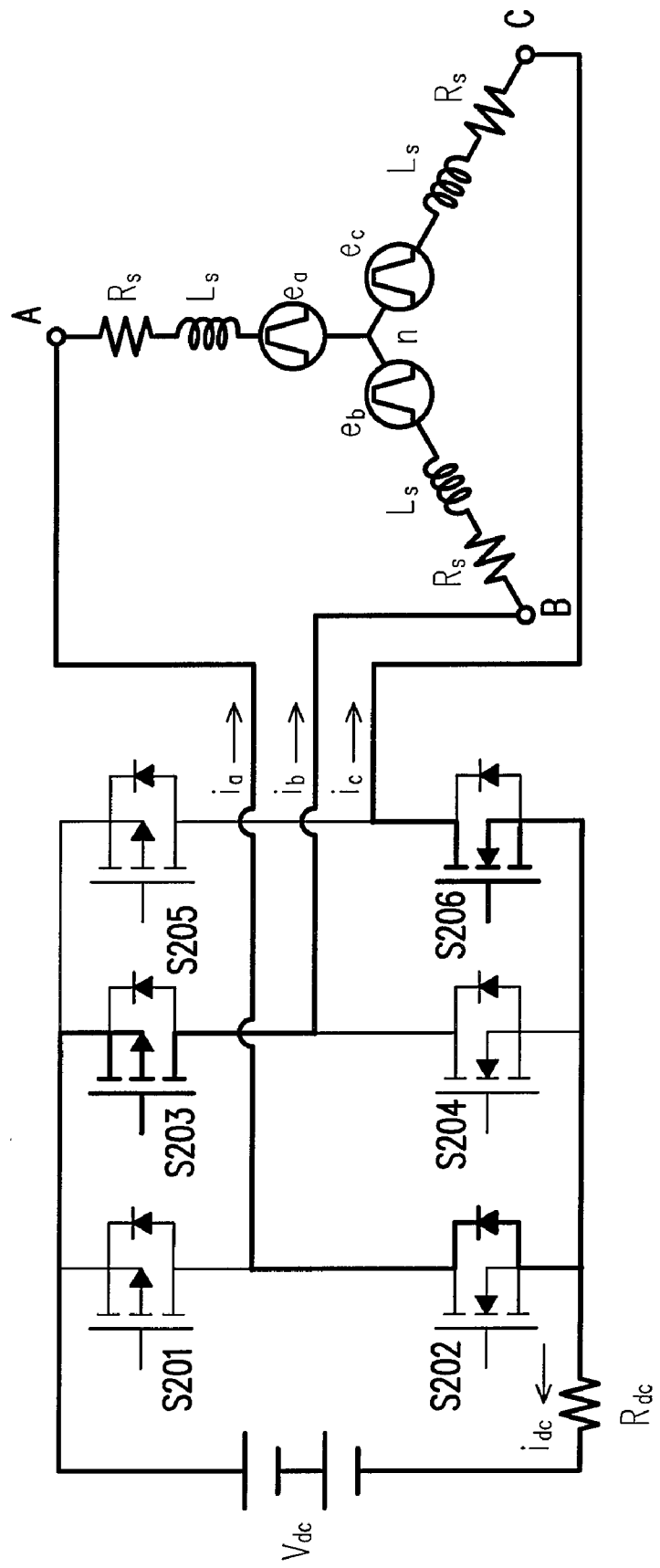
FIG. 10 is a circuit analysis diagram according to the embodiment of the present invention, which is corresponding to the three-phase conducting duration of B+C− and complementary switching in a PWM-on state.

A brief analysis on a situation of three-phase conducting under complementary switching is described hereinafter. FIG. 10 is a circuit analysis diagram according to the embodiment of the present invention, which is corresponding to the three-phase conducting duration of B+C− and complementary switching in a PWM-on state. According to FIG. 10, the voltages $v_a, v_b, v_c$ of the nodes A, B and C can be expressed as follows:

$$v_a = i_{dc} R_{dc} - V_d$$

$$v_b = V_{dc} - i_b R_{pon}$$

$$v_c = i_{dc} R_{dc} - i_c R_{non}$$

$$i_{dc} = i_b$$

Figure 11:
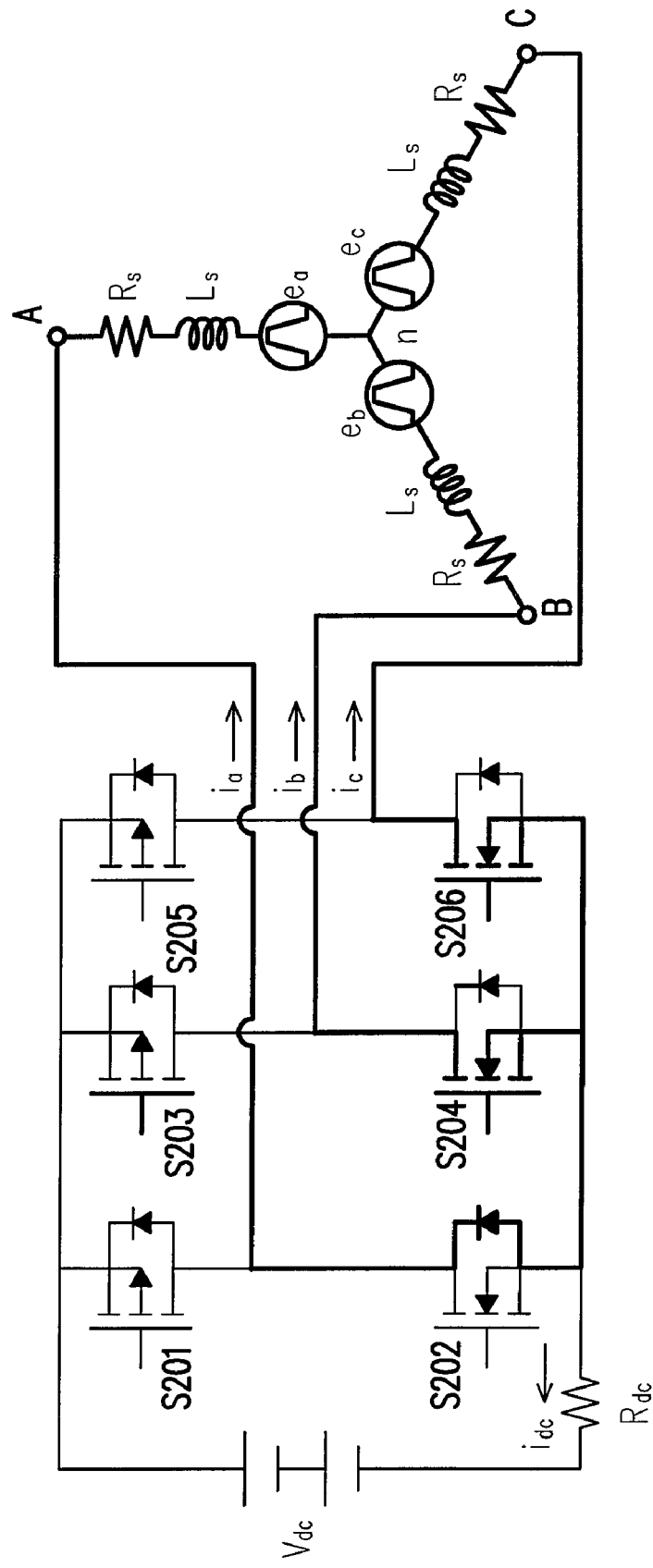
FIG. 11 is a circuit analysis diagram according to the embodiment of the present invention, which is corresponding to the three-phase conducting duration of B+C− and complementary switching in a PWM-on state.

FIG. 11 is a circuit analysis diagram according to the embodiment of the present invention, which is corresponding to the three-phase conducting duration of B+C− and complementary switching in a PWM-on state. According to FIG. 11, the voltages $v_a, v_b, v_c$ of the nodes A, B and C can be expressed as follows:

$$v_a = -V_d$$

$$v_b = -i_b R_{non}$$

$$v_c = -i_c R_{non}$$

$$i_{dc} = 0$$

Figure 12:
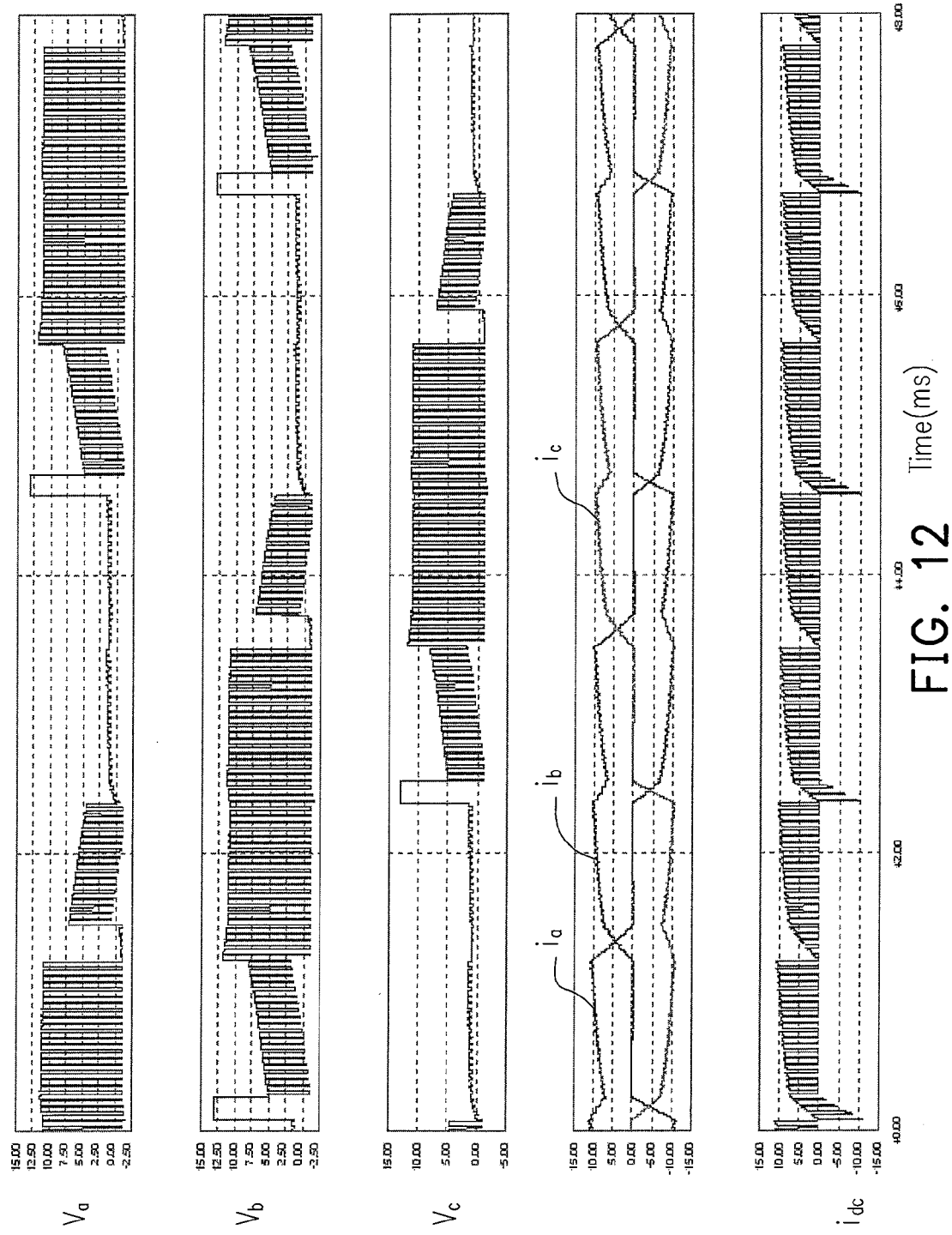
FIG. 12 and FIG. 13 are graphs where the simulation voltages and currents of three-phase stator coils with a complementary switching configuration according to the embodiment of the present invention are given.
Figure 13:
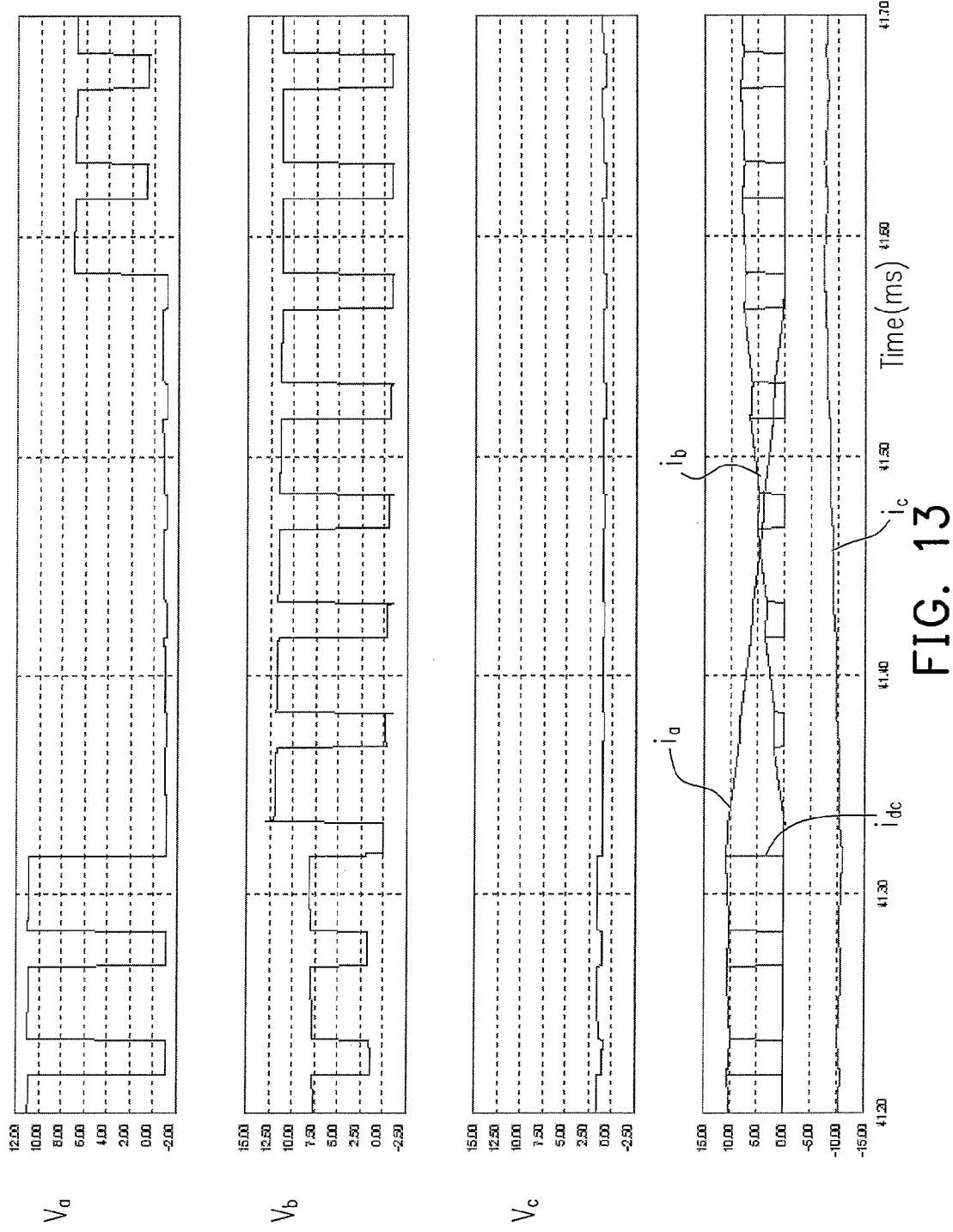

FIG. 12 and FIG. 13 are graphs where the simulation voltages and currents of three-phase stator coils with a complementary switching configuration according to the embodiment of the present invention are given. The correctness of the above-described analysis can be verified by the simulation results shown in FIGS. 12 and 13.

Figure 14:
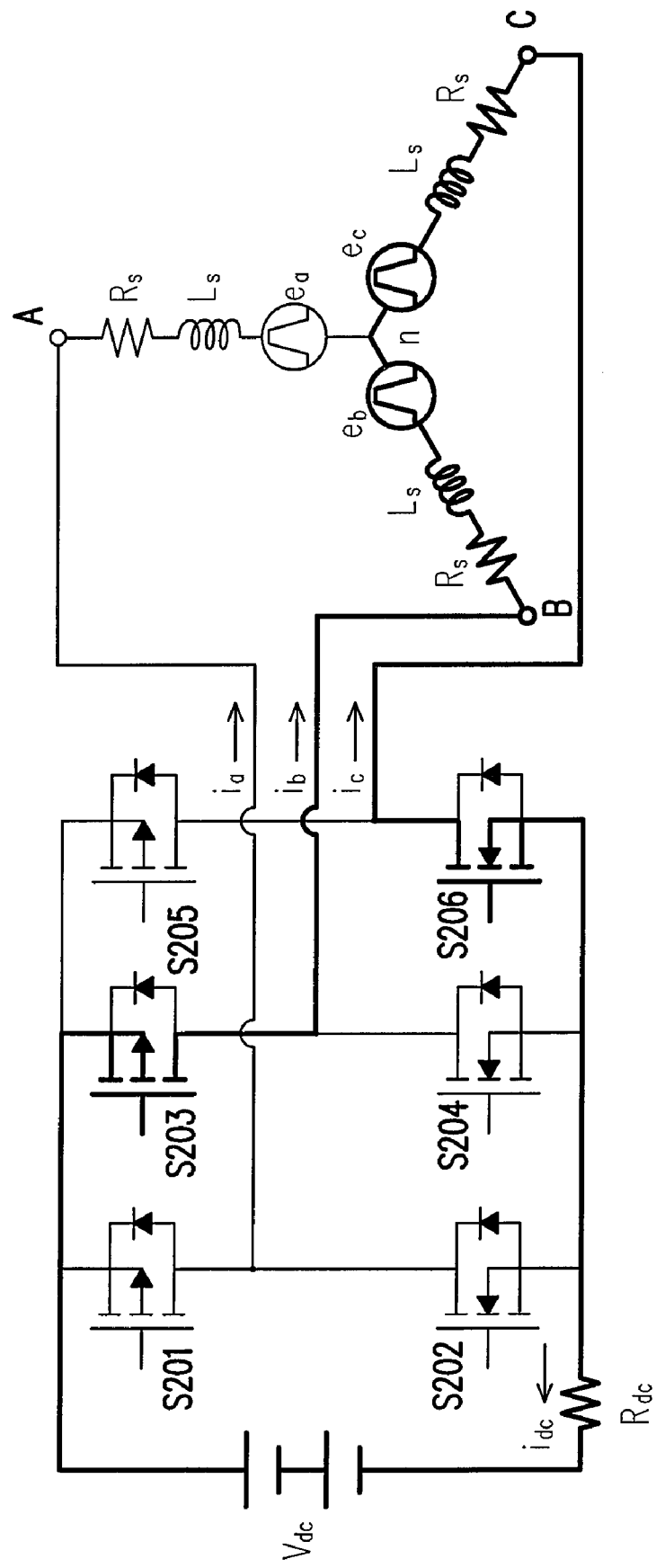
FIG. 14 is a circuit analysis diagram according to the embodiment of the present invention, which is corresponding to a two-phase conducting duration, high-side switching and high-side switching in a PWM-on state and the conducting sequence B+C−.

A brief analysis on a situation of two-phase conducting under high-side switching and complementary switching is described hereinafter. FIG. 14 is a circuit analysis diagram according to the embodiment of the present invention, which is corresponding to a two-phase conducting duration, high-side switching and high-side switching in a PWM-on state and the conducting sequence B+C−. Referring to FIG. 14, the voltages $v_a, v_b, v_c$ of the nodes A, B and C can be expressed as follows:

$$v_a = e_a + v_n$$

$$v_b = V_{dc} - i_b R_{pon}$$

$$v_c = i_{dc} R_{dc} - i_c R_{non}$$

$$i_{dc} = i_b$$

Figure 15:
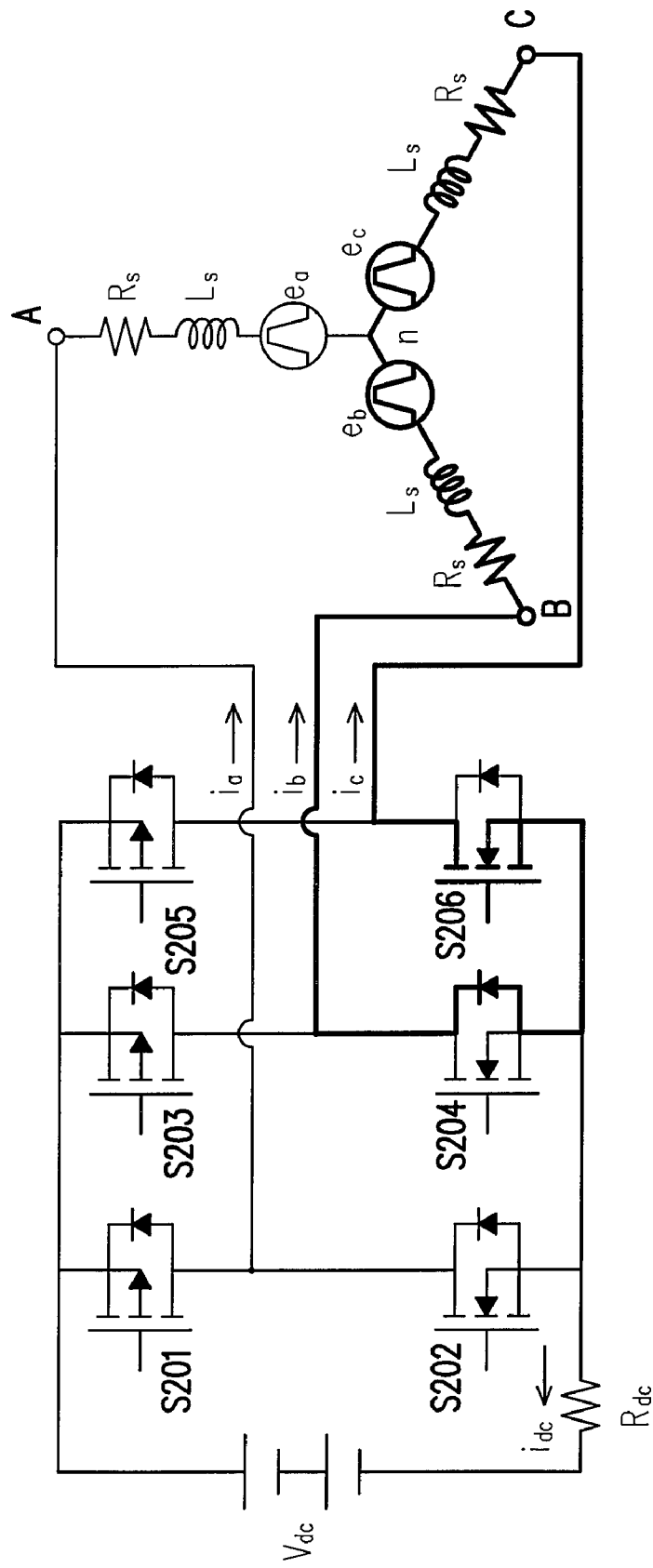
FIG. 15 is a circuit analysis diagram according to the embodiment of the present invention, which is corresponding to the two-phase conducting duration of B+C− and high-side switching in a PWM-on state.

FIG. 15 is a circuit analysis diagram according to the embodiment of the present invention, which is corresponding to the two-phase conducting duration of B+C− and high-side switching in a PWM-on state. Referring to FIG. 15, the voltages $v_a, v_b, v_c$ of the nodes A, B and C can be expressed as follows:

$$v_a = e_a + v_n$$

$$v_b = -V_d$$

$$v_c = -i_c R_{non}$$

$$i_{dc} = 0$$

Figure 16:
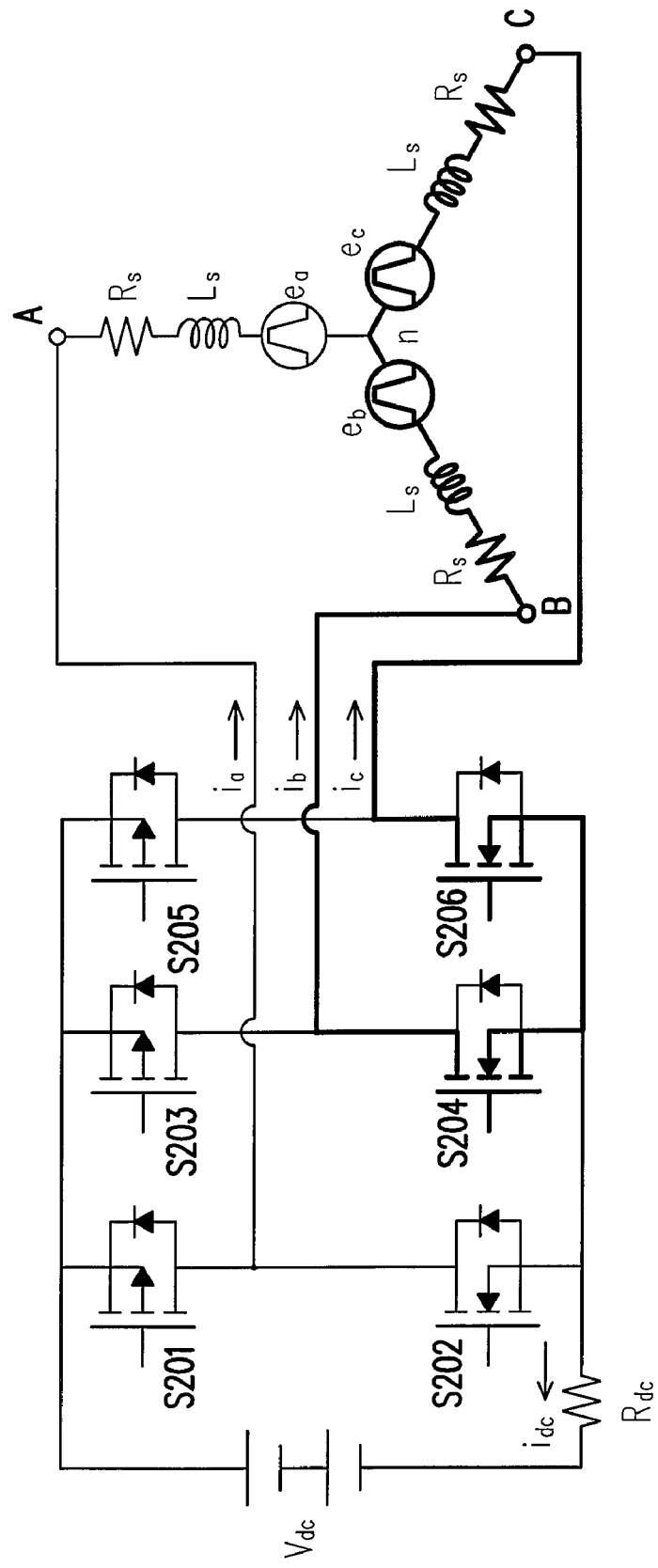
FIG. 16 is a circuit analysis diagram according to the embodiment of the present invention, which is corresponding to the two-phase conducting duration of B+C− and complementary switching in a PWM-on state.

FIG. 16 is a circuit analysis diagram according to the embodiment of the present invention, which is corresponding to the two-phase conducting duration of B+C− and complementary switching in a PWM-on state. Referring to FIG. 16, the voltages $v_a, v_b, v_c$ of the nodes A, B and C can be expressed as follows:

$$v_a = e_a + v_n$$

$$v_b = -i_b R_{non}$$

$$v_c = -i_c R_{non}$$

$$i_{dc} = 0$$

-continued $$v_n = \frac{1}{3}(v_a + v_b + v_c) + \frac{1}{3}e_{sum}$$

where $v_n$ is the voltage of the common node of the three-phase coils and $e_{sum}$ is the sum of the back-EMFs.

In summary of the above-described mathematic analyses of the circuitry, several results can be obtained as follows.

Corresponding to the two-phase conducting duration of B+C− and high-side switching and complementary switching in a PWM-on state:

$$v_a = \frac{3}{2}e_a + \frac{1}{2}V_{dc} - \frac{1}{2}(i_b R_{pon} + i_c R_{non} - i_b R_{dc}) + \frac{1}{2}e_{sum}$$

$$e_a = \frac{2}{3}v_a - \frac{1}{3}V_{dc} + \frac{1}{3}(i_b R_{pon} + i_c R_{non} - i_b R_{dc}) - \frac{1}{3}e_{sum}$$

corresponding to the two-phase conducting duration of B+C− and high-side switching in a PWM-on state:

$$v_a = \frac{3}{2}e_a - \frac{1}{2}(V_d + i_c R_{non}) + \frac{1}{2}e_{sum}$$

$$e_a = \frac{2}{3}v_a + \frac{1}{3}(V_d + i_c R_{non}) - \frac{1}{3}e_{sum}$$

corresponding to the two-phase conducting duration of B+C− and complementary switching in a PWM-on state:

$$v_a = \frac{3}{2}e_a + \frac{1}{2}e_{sum}$$

$$e_a = \frac{2}{3}v_a - \frac{1}{3}e_{sum}$$

It can be seen from the above-described analyses that corresponding to the conducting duration of the B phase coil and the C phase coil and a PWM-on state or a PWM-off state, the back-EMF $e_a$ of the phase A can be obtained by using the voltage $v_a$ of the node A. In other words, as long as any two phase coils are conducted and the rest third phase coil has no current, the back-EMF can be detected by using the voltage of the node where the stator coil having no current and the corresponding switch are coupled to. During the above-mentioned two-phase conducting duration, the back-EMF inducted by the stator coil having no current can be expressed by modified mathematic equations as follows.

Corresponding to high-side switching and complementary switching in a PWM-on state:

$$e_{open} = \frac{2}{3}v_{open} - \frac{1}{3}V_{dc} + \frac{1}{3}(i_{on}R_{pon} + i_{off}R_{non} - i_{on}R_{dc}) - \frac{1}{3}e_{sum} \quad (EQ01)$$

corresponding to high-side switching in a PWM-on state:

$$e_{open} = \frac{2}{3}v_{open} + \frac{1}{3}(V_d + i_{off}R_{non}) - \frac{1}{3}e_{sum} \quad (EQ02)$$

corresponding to the two-phase conducting duration of B+C− and complementary switching in a PWM-on state:

$$e_{open} = \frac{2}{3}v_{open} - \frac{1}{3}e_{sum} \quad (EQ03)$$

where $e_{open}$ is the back-EMF inducted by the stator coil having no current, $v_{open}$ is the terminal voltage of the stator coil having no current, $V_{dc}$ is a DC input voltage, $V_d$ is the cut-in voltage of a body-diode and $e_{sum}$, is the sum of the back-EMFs. Although the above described is related to high-side switching and complementary switching, but one skilled in the art should be able to infer the mathematic equations corresponding to low-side switching according to the above-described idea.

Figure 17:
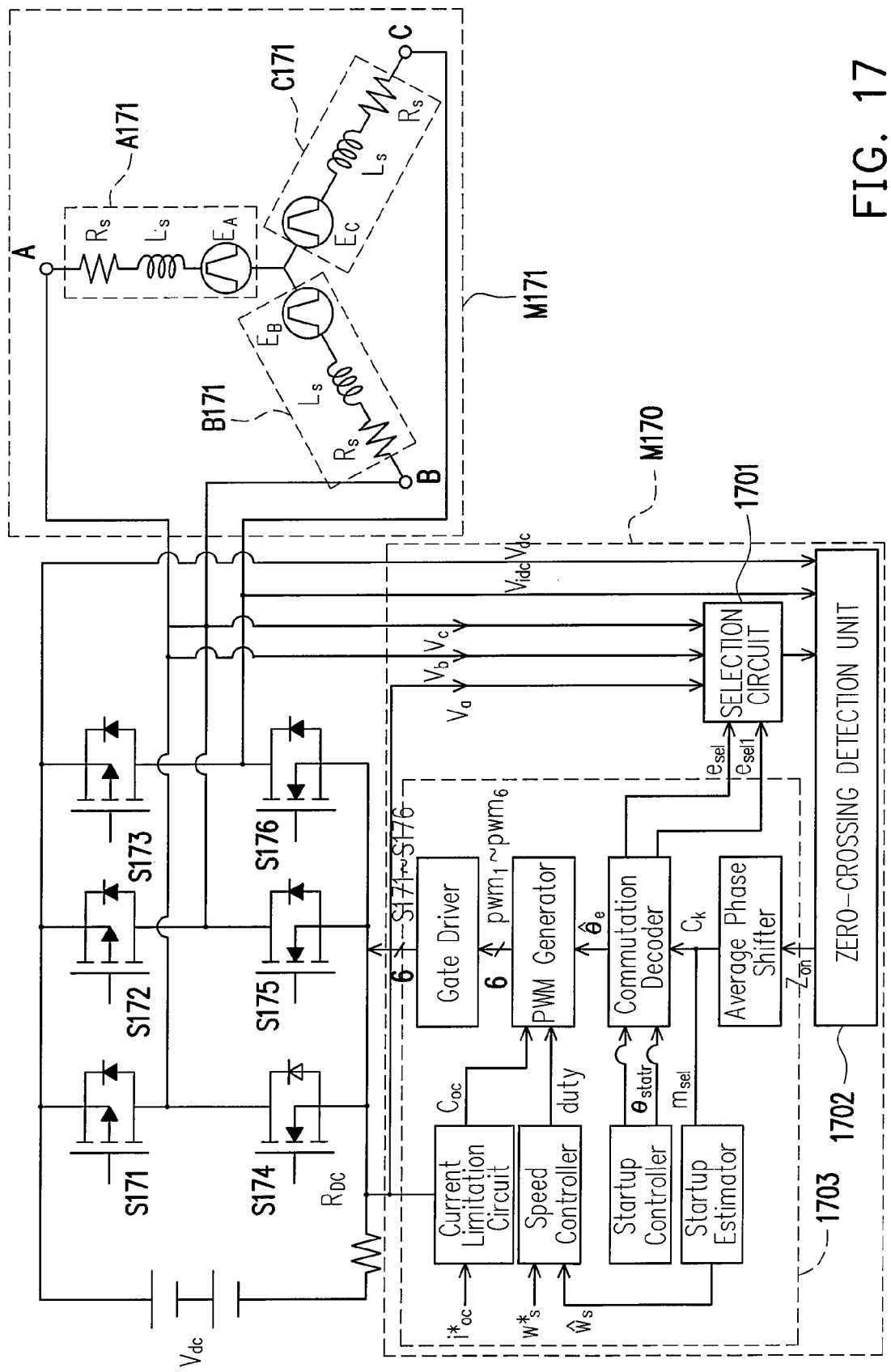
FIG. 17 is a circuit block diagram of a brushless motor system according to the embodiment of the present invention.

FIG. 17 is a circuit block diagram of a brushless motor system according to the embodiment of the present invention. Referring to FIG. 17, the circuit includes a circuit for controlling a motor M170, upper-bridge switches S171-S173, lower-bridge switches S174-S176, an impedance element $R_{dc}$ and a brushless motor M171, wherein the brushless motor 171 includes three-phase stator coils A171, B171 and C171, while the circuit for controlling a motor M170 includes a selection circuit 1701, a zero-crossing detection unit 1702 and a control circuit 1703.

The selection circuit 1701 is coupled to the nodes A, B and C of the stator coils A171, B171 and C171. The selection circuit 1701 selects one of the voltages of the nodes A, B and C and responds to the selected voltage to the output terminal TS of the selection circuit 1701. The selection rule of the selection circuit 1701 is described as follows. when the upper-bridge switch and the lower-bridge switch coupled by the node A are being controlled in PWM mode and the lower-bridge switch coupled by the node C is turned on (high-side switching or complementary switching), or when the upper-bridge switch and the lower-bridge switch coupled by the node C are being controlled in PWM mode and the lower-bridge switch coupled by the node A is turned on (high-side switching or complementary switching), or when the upper-bridge switch coupled by the node A is being controlled in PWM mode and the lower-bridge switch coupled by the node C is controlled in PWM mode (low-side switching), or when the upper-bridge switch coupled by the node C is turned on and the lower bridge switch coupled by the node A is being controlled in PWM mode (low-side switching), then, the voltage of the node B is selected and responded to the output terminal TS of the selection circuit 1701. Similarly, when the upper-bridge switch and the lower-bridge switch coupled by the node B are being controlled in PWM mode and the lower-bridge switch coupled by the node C is turned on, or when the upper-bridge switch and the lower-bridge switch coupled by the node C are being controlled in PWM mode and the lower-bridge switch coupled by the node B is turned on, then, the voltage of the node A is selected and responded to the output terminal TS of the selection circuit 1701; when the upper-bridge switch and the lower-bridge switch coupled by the node A are being controlled in PWM mode and the lower-bridge switch coupled by the node B is turned on, or when the upper-bridge switch and the lower-bridge switch coupled by the node B are being controlled in PWM mode and the lower-bridge switch coupled by the node A is turned on, then, the voltage of the node C is selected and responded to the output terminal TS of the selection circuit 1701. In a short, the selection circuit 1701 is designed to select the voltage $V_s$ of a non-excited node and make the selected voltage respond to the output terminal thereof. (One skilled in the art should be known that "the selected voltage responds to the output terminal" could be implemented at least three means, recited: 1. the selected voltage is connected to the output terminal. 2. the selected voltage is coupled to the output terminal. 3. the selected voltage is scaled according to a proportion then connected/coupled to the output terminal.)

The zero-crossing detection unit 1702 is coupled to the output terminal TS of the selection circuit 1701 and receives the $V_s$ at the output terminal of the selection circuit 1701. The function of the zero-crossing detection unit 1702 is to remove the power voltage $V_{dc}$ and the voltage across the impedance element $V_{idc}$ in the voltage $V_S$ for obtaining a first back-EMF voltage $V_{emf\_on}$ related to the back-EMF. Referring to the above-mentioned equation EQ01, in PWM-on mode, in order to obtain the back-EMF $e_{open}$, a half of $V_{dc}$ and a half of the voltage $V_{idc}$ across the impedance $R_{DC}$ ($V_{idc}=i_{on}R_{DC}$) must be inferred from Vopen. After obtaining the first back-EMF voltage $V_{emf\_on}$, the zero-crossing detection unit 1702 compares the first back-EMF voltage $V_{emf\_on}$ with a first reference voltage $V_{ref1}$ and outputs a first zero-crossing judgement signal $Z_{on}$. After that, the control circuit 1703 judges the time point of a zero-crossing event according to the first zero-crossing judgement signal $Z_{on}$ so as to control the above-mentioned upper switches and lower-bridge switches S171-S176 for switching and thereby to control the motor.

The above-described embodiment only describes one of implementations of the motor system and the circuit for controlling a motor M170 according to the spirit of the present invention, i.e., only one of schemes to estimate the time point of a zero-crossing in a PWM-on state is involved. Since the control circuit 1703 has no particular features; in fact, many conventional implementations thereof are available prior to the application of the present patent, therefore, the control circuit 1703 is omitted to describe in detail except an embodiment described hereinafter where a method for controlling a motor commutation by detecting the 30 electrical degree after a zero-crossing point is described and the control circuit would be involved. In order to make one skilled in the art more understand the spirit of the present invention, and to further advance the accuracy of estimating a zero-crossing time point, a few more of implemented circuits and the operation methods thereof are given hereinafter.

Figure 18:
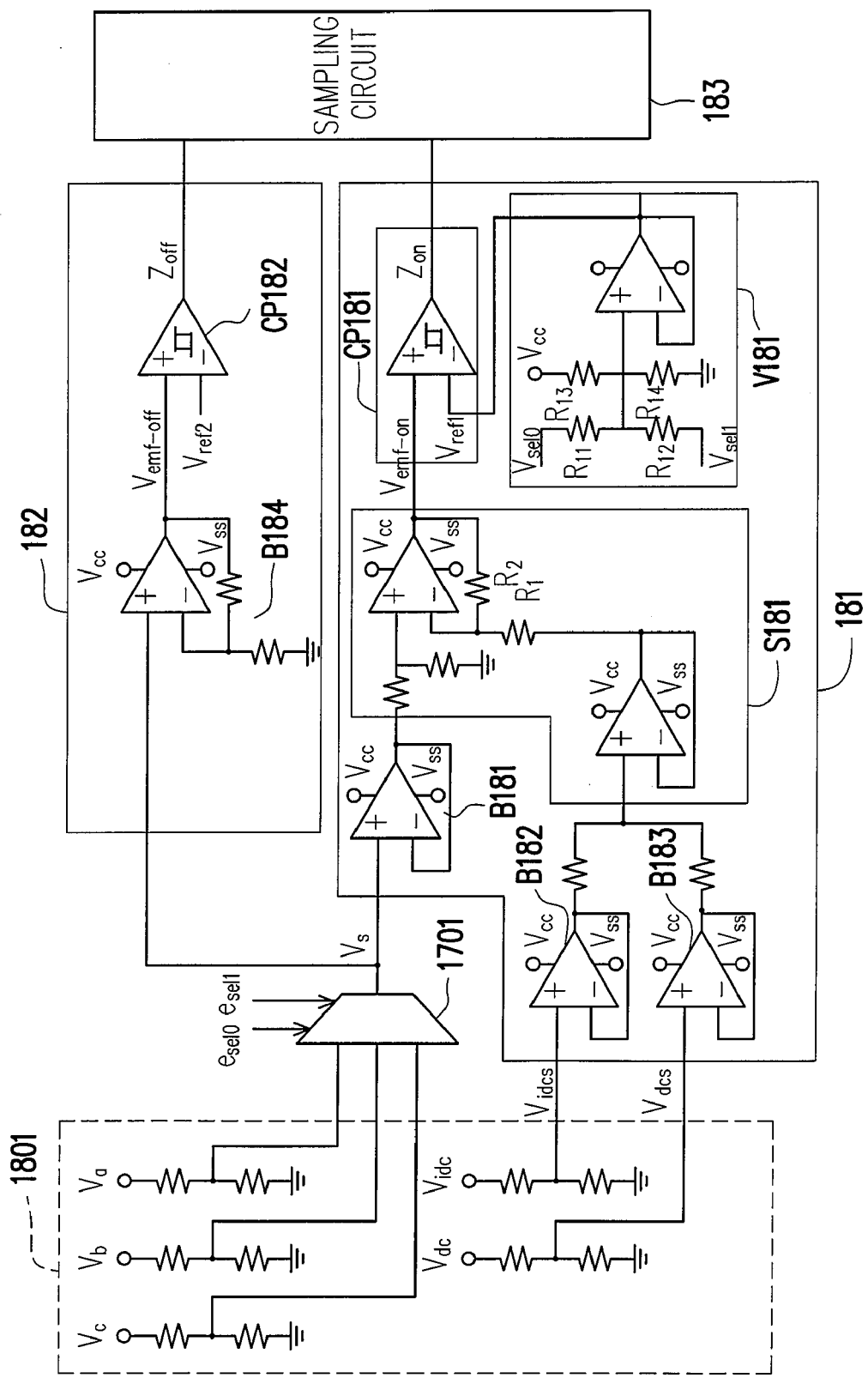
FIG. 18 is a schematic circuit drawing of the circuit for controlling a motor M170 in FIG. 17 according to the embodiment of the present invention.

FIG. 18 is a schematic circuit drawing of the circuit for controlling a motor M170 in FIG. 17 according to the embodiment of the present invention. Referring to FIG. 18, the circuit for controlling a motor M170 can be divided into two sectors, the first sector is a first zero-crossing detection circuit 181 and the second sector is a second zero-crossing detection circuit 182. The first zero-crossing detection circuit 181 is used for comparing $V_{emf\text{-}on}$ with the first reference voltage $V_{ref1}$ and outputting the first zero-crossing judgement signal $Z_{on}$ in the above-mentioned PWM-on state. The second zero-crossing detection circuit 182 is used for taking the voltage $V_S$ at the output terminal of the selection circuit 1701 as the second back-EMF voltage $V_{emf\_off}$, comparing the second back-EMF voltage $V_{emf\_off}$ off with a second reference voltage $V_{ref2}$ and outputting a second zero-crossing judgement signal $Z_{off}$ in a PWM-off state, i.e, the situation that the upper-bridge switch coupled by the second terminal of the first phase coil is turned off. The embodiment further includes a sampling circuit 183 for sampling $Z_{on}$ and $Z_{off}$.

Referring to FIG. 18, a proportionally voltages-reducing circuit 1801 is coupled to the selection circuit 1701 and the first zero-crossing detection circuit 181, and the proportionally voltages-reducing circuit is implemented by using voltage-dividing resistors. Since, in practice, the voltages of stator coils $v_a, v_b$ and $v_c$, the power voltage $V_{dc}$ and the voltage $V_{idc}$ across the impedance element $R_{DC}$ may be greater than the voltage endurance voltages of the selection circuit 1701 and the first and second zero-crossing detection circuits 181 and 182, therefore, a proportionally voltages-reducing circuit 1801 is required to avoid the circuits from burning. Considering the proportionally voltages-reducing circuit 1801, the above-mentioned $v_a, v_b, v_c, V_{dc}$ and $V_{idc}$ are respectively reduced in a predetermined proportion, and the reduced voltages are respectively represented by $v_{as}, v_{bs}, v_{cs}, V_{dcs}$ and $V_{idcs}$ in FIG. 18.

The first zero-crossing detection circuit 181 in the embodiment includes buffers B181-B183, a differential amplifier S181, a reference voltage generator V181 and a comparator CP181. The second zero-crossing detection circuit 182 includes an amplifier B184 and a comparator CP182. All the above-mentioned buffers B181-B183 perform buffer processing on the voltages $V_S, V_{dc}$ and $V_{idc}$ to avoid the correctness of a load effect on the voltages. In an ideal condition however, the buffers B181-B183 can be neglected. The resistors $R_1$ and $R_2$ in the differential amplifier S1181 are for controlling the gain of the circuit. From a theoretical point of view, when $R_1$ and $R_2$ are equal to each other, $V_{emf\text{-}on}$ would be equal to ($V_S - (V_{dcs} + V_{idcs})/2$), thus, $V_{emf\text{-}on}$ and $e_{open}$ are quite close to each other. In other words, $V_{emf\text{-}on}$ in the embodiment can be considered as a voltage varied with a back-EMF. Thus, once the ratio $R_2/R_1$ is increased, the ratio of change of the estimated back-EMF voltage can be increased accordingly, which would reduce the glitch caused by a slowly changed voltage during the outputting of the comparator and advance the correctness of judging a zero-crossing signal.

The positive input terminal of comparator receives $V_{emf\text{-}on}$, while the negative input terminal thereof receives the first reference voltage $V_{ref1}$ output from the reference voltage generator V181 and the output terminal of the comparator outputs the first zero-crossing judgement signal $Z_{on}$. The reference voltage generator V181 decides the amount of the first reference voltage $V_{ref1}$ according to voltages $V_{sel0}$ and $V_{sel1}$. In the present embodiment, the voltages $V_{sel0}$ and $V_{sel1}$ are one of $V_{cc}$ and the grounded voltage. It can be seen from the reference voltage generator V181 in FIG. 18, when both of the voltages $V_{sel0}$ and $V_{sel1}$ take a higher level $V_{cc}$, the first reference voltage $V_{ref1}$ has a higher level; when both of the voltages $V_{sel0}$ and $V_{sel1}$ are grounded, the first reference voltage $V_{ref1}$ has a lower level; when the voltages $V_{sel0}$ and $V_{sel1}$ are respectively a higher level $V_{cc}$ and grounded, the first reference voltage $V_{ref1}$ has a middle level. In the following, some experimental waveforms are shown to explain the decision mechanism of the voltages $V_{sel0}$ and $V_{sel1}$.

Figure 19:
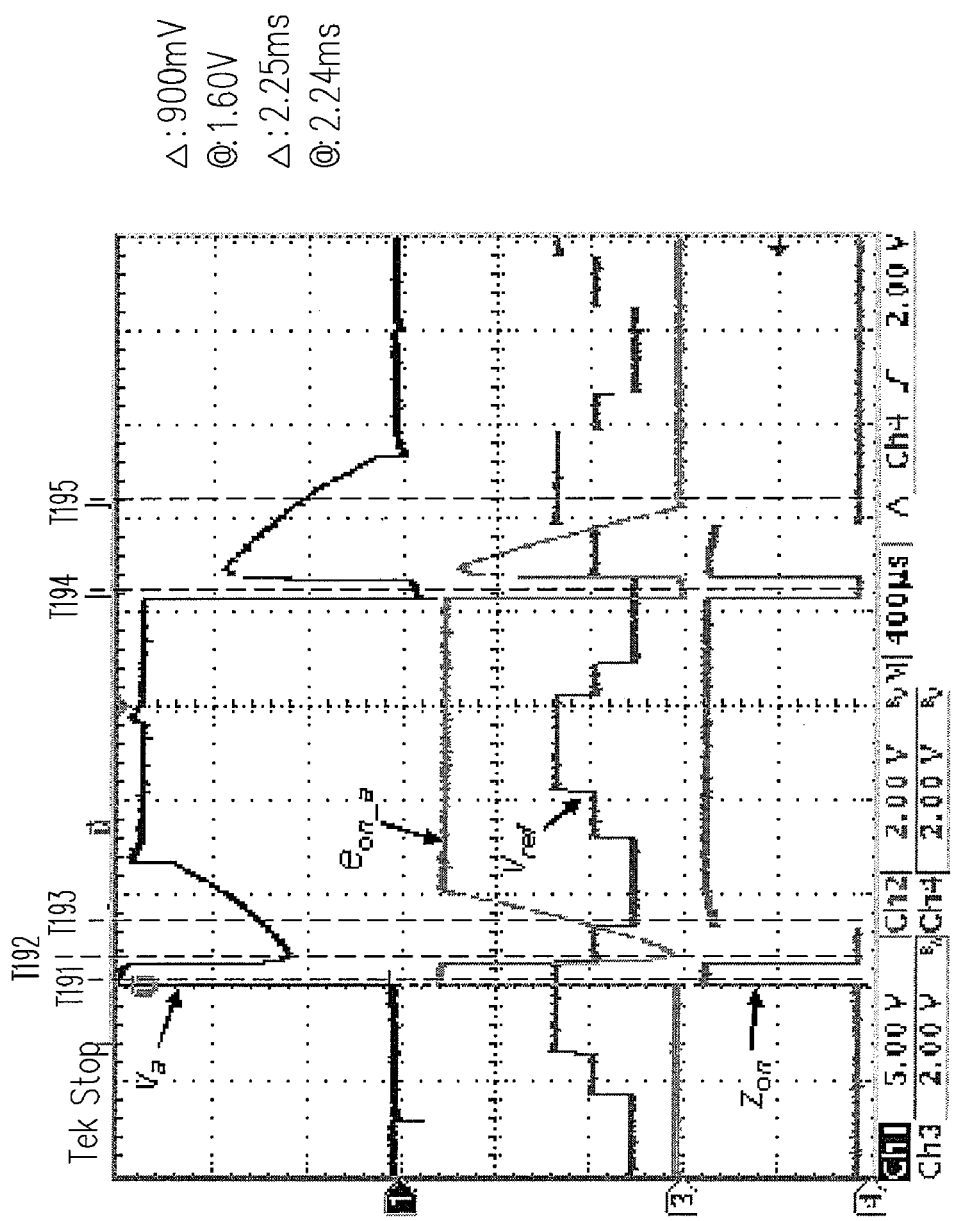
FIG. 19 is a graph showing experimental waveforms of the circuit of FIG. 18 tested by an oscilloscope according to the embodiment of the present invention.

FIG. 19 is a graph showing experimental waveforms of the circuit of FIG. 18 tested by an oscilloscope according to the embodiment of the present invention. The waveforms in FIG. 19 include the voltage $v_a$ of the node A, the first back-EMF voltage $V_{emf\_on}$, the first reference voltage $V_{ref1}$ and the first zero-crossing judgement signal $Z_{on}$. The waveforms are measured during the conducting of the phase coil B and the phase coil C. Referring to FIGS. 17 and 19, in a duration T191-T192, an upper-bridge switch S172 and a lower-bridge switch S175 coupled to the node B start to switch by a PWM control, wherein a current flows from the node B of the B phase coil B171 to the node C of the C phase coil C171; but the stored energy in the A phase coil A171 does not complete discharging, i.e., there is a current in the A phase coil A171. Therefore, in the duration T191-T192, it is unable to measure a back-EMF from the node A, and both the voltages $V_{sel0}$ and $V_{sel1}$ at the time take the power voltage $V_{cc}$.

Figure 5:
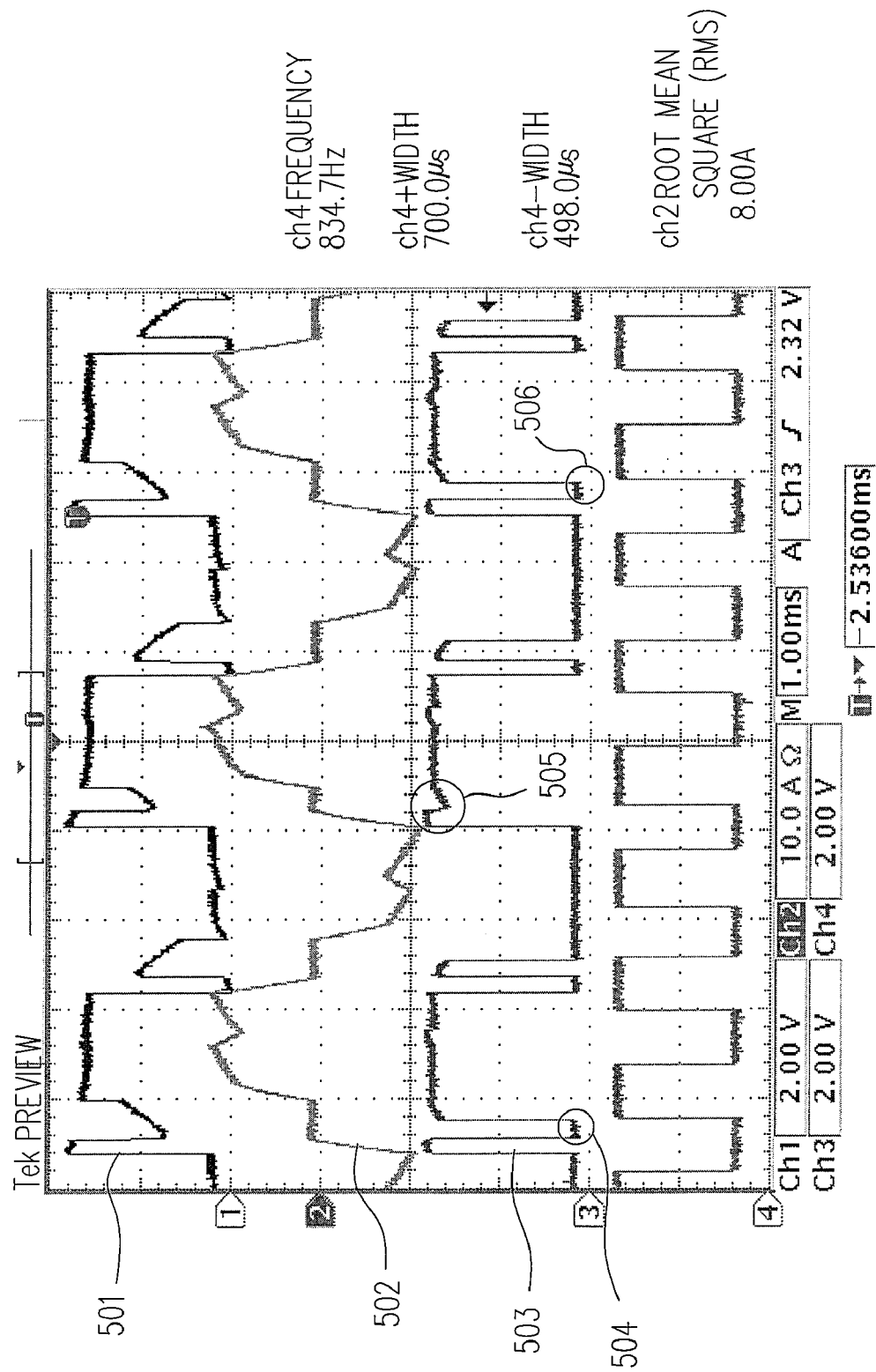
FIG. 5 is a graph where experimental waveforms of the prior art cited from the references [8] and [9] are given.

At the time point T192, the energy of the A phase coil A171 is discharged completely and the BC two-phase conducting duration starts. At the time, the voltage $v_a$ of the node A instantly drops down and takes a level lower than the previous level, the first reference voltage $V_{ref1}$, meanwhile the voltages $V_{sel0}$ and $V_{sel1}$ take different levels, a higher level and a lower level, for example, $V_{sel0}$ is equal to the power voltage $V_{cc}$, while $V_{sel1}$ is equal to the grounded voltage or for example, $V_{sel0}$ is equal to the grounded voltage, while $V_{sel1}$ is equal to the power voltage $V_{cc}$. In this case, the first reference voltage $V_{ref1}$ would change from a higher level to a middle level. It is noted that the descending duration of the voltage $v_a$ with a heavy application is very short, as shown by FIG. 19, so that the zero-crossing point 505 in FIG. 5 can not be detected by using the methods of the patents [8] and [9]. By using the method of the present embodiment which improves the first reference voltage $V_{ref1}$ however, the problem the patents [8] and [9] confront can be solved, since at the initial time point T191, the first reference voltage is set at a higher level.

At the time point T193, the first back-EMF voltage $V_{emf\_on}$ exceeds the first reference voltage $V_{ref1}$ again, which means the back-EMF is transited from a lower level to the zero level and further to a higher level, in other words, a zero-crossing event occurs. Meanwhile, the voltages $V_{sel0}$ and $V_{sel1}$ are set at the grounded voltage to make the first reference voltage $V_{ref1}$ take a lower level and start judging whether a zero-crossing event occurs with the back-EMF of the B phase coil or the C phase coil. Limited by the probe number of the oscilloscope during the measurement, there is no node voltage of the other phase coil shown in the experimental waveforms. The operation principle of the duration T194-T195 is almost same as that of the duration T191-T193. In the duration T194-T195, the back-EMF is transited from a higher level to a lower level and the operation thereof is similar to the duration T191-T193 except the upside down levels of the voltages, thus it is omitted to describe herein.

The negative input terminal of the comparator CP182 in the second zero-crossing detection circuit 182 receives the second reference voltage $V_{ref2}$, while the positive input terminal of comparator CP182 is coupled to the output terminal of an amplifier B184. Basically, the second reference voltage $V_{ref2}$ can be the grounded voltage. Referring to the above-described equations EQ02 and EQ03, it can be seen that the back-EMF $e_{open}$ in a PWM-on state is directly related to $V_{open}$ but little related to other parameters. Considering the second zero-crossing detection circuit 182 is mainly used to detect the back-EMF variation in a PWM-on state, therefore, the zero-crossing time point can be obtained simply by comparing the voltage $V_S$ at the output terminal of the selection circuit 1701 with the grounded voltage.

Figure 20:
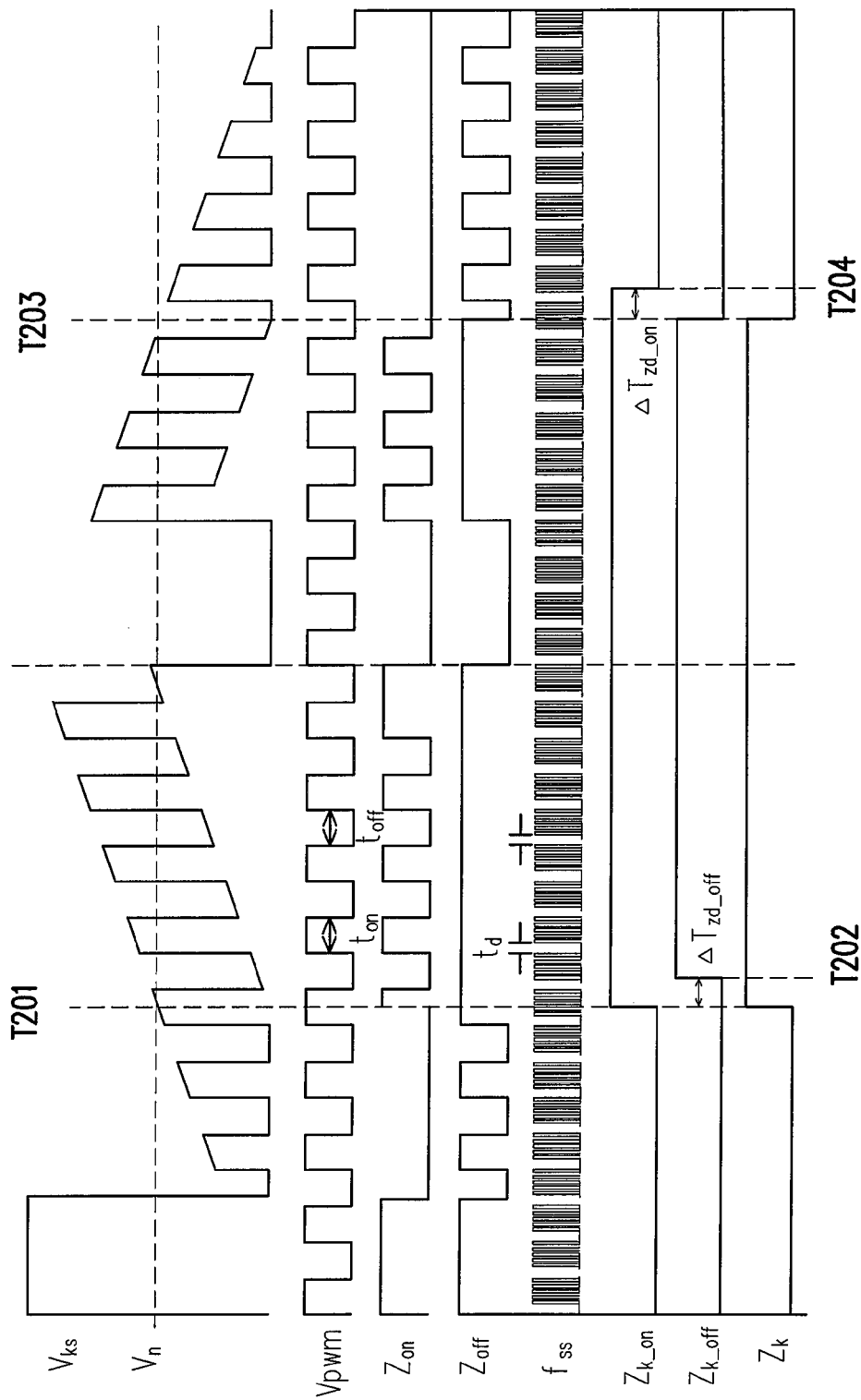
FIG. 20 is a diagram showing waveforms of the circuit for controlling a motor according to the embodiment of the present invention.

In comparison with the embodiment of FIG. 17, the present embodiment further introduces a second zero-crossing detection circuit 182 for detecting a zero-crossing in a PWM-off state. The sampling circuit 183 respectively samples $Z_{on}$ in a PWM-on state and $Z_{off}$ under PWM-off state. The control circuit 1703 decides how the switches are switched. FIG. 20 is a diagram showing waveforms of the circuit for controlling a motor according to the embodiment of the present invention. In FIG. 20, the output voltage of the selection circuit Vs, the PWM signal $V_{pwm}$, the first zero-crossing judgement signal $Z_{on}$, the second zero-crossing judgement signal $Z_{off}$, the sampling signal $f_{ss}$ and a zero-crossing indication signal $Z_k$ are shown.

At the time point T201, a zero-crossing in a PWM-on state just occurs, meanwhile, the sampling signal $f_{ss}$ samples $Z_{on}$ and the zero-crossing indication signal $Z_k$ is directly pulled to a high level, which means a zero-crossing event occurs. At the next time point T202, the sampling signal $f_{ss}$ samples $Z_{off}$. Since a sampled $Z_{off}$ also indicates a zero-crossing event occurs, which conflicts with the real zero-crossing point of the time point T201, thus, a scheme for judging a zero-crossing event by using $Z_{on}$ or $Z_{off}$ alone is not appropriate and may cause a time error of T201 and T202. However, the embodiment of FIG. 18 is able to correct such sort of time error. At the time point T203, the sampling signal $f_{ss}$ samples $Z_{off}$ first, which means a zero-crossing event corresponding to PWM-off state just occurs and, thus, the zero-crossing indication signal $Z_k$ would be pulled to a low level. At the final time point T204, the sampling signal $f_{ss}$ samples $Z_{on}$, thus, the zero-crossing indication signal $Z_k$ keeps unchanged.

It can be seen from the above-mentioned waveforms that the embodiment of FIG. 18 simultaneously utilizes PWM-on state and PWM-off state to estimate a zero-crossing event, therefore, the zero-crossing time point can be more accurately estimated.

It needs to be noted that the circuit provided by the above embodiments usually employs two power voltages $V_{CC}$ and $V_{SS}$. If the power voltages are modified as $V_{CC}$ and the grounded voltage, it is needed merely that the voltage output from the subtracting circuit S181 in the first zero-crossing detection circuit 181 is added by an offset voltage in association with modifying the first reference voltage. The same way can be applied in the buffers of the second zero-crossing detection circuit 182 in association with modifying the second reference voltage. Although the above-mentioned circuit modifications are not particularly described by the embodiment, but the above-mentioned circuit modifications should be covered by the spirit of the present invention. In addition, regardless of the block which representing the above-mentioned sampling circuit 183 in FIG. 18, one skilled in the art should understand the first zero-crossing detection circuit 181 and the second zero-crossing detection circuit 182 can respectively include a built-in sampling circuit for respectively sampling the voltages in a PWM-on state and a PWM-off state in a specific embodiment, therefore, such an embodiment should be covered by the spirit of the present invention as well. In the present embodiment, the sampling signal $f_{ss}$ contains a non-duty time $t_d$, which is added for adapting a situation, where a changed reference voltage may cause interference, thus, within a period of time after the reference voltage gets changed, a wrong judgment of zero-crossing must be avoided. In other embodiments or in an ideal condition, the non-duty time $t_d$ is not needed and omitted to describe.

Figure 22:
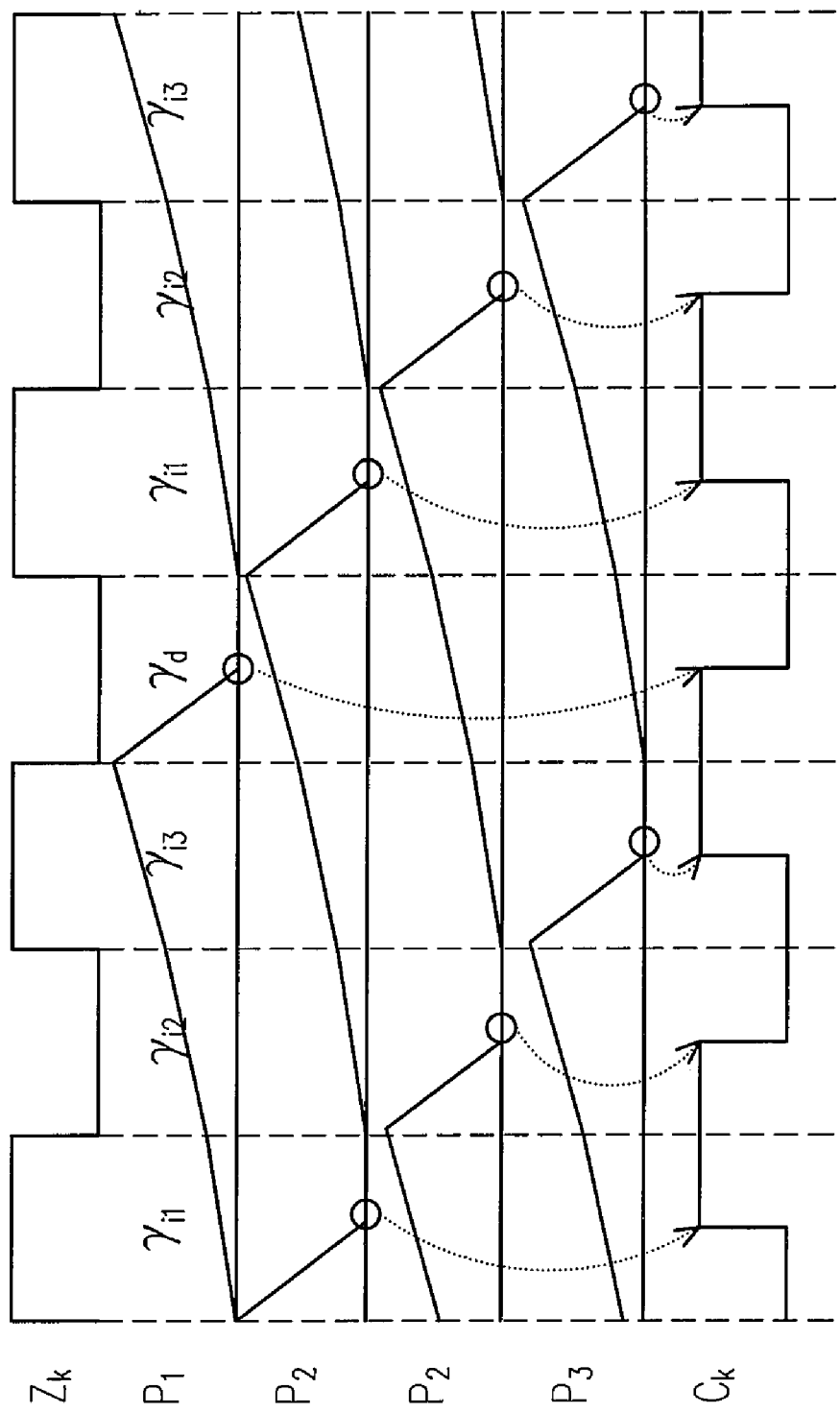
FIG. 22 is a diagram wherein waveforms of a commutation-indicating signal $C_k$ and a zero-crossing indication signal $Z_k$ are given according to the embodiment of the present invention.

Another implementation of the control circuit is further provided by the present invention, wherein the circuit is used for controlling the commutation of a motor by delaying the zero-crossing indication signal $Z_k$ by 30 electrical degrees. The scheme described hereinafter does not need memories to save the longest, the middle and the shortest commutation time as the patent [10]; instead, the scheme needs a simple counter circuit. FIG. 22 is a diagram wherein waveforms of a commutation-indicating signal $C_k$ and a zero-crossing indication signal $Z_k$ are given according to the embodiment of the present invention. Corresponding to an ideal condition that the load and the rotation speed are constant, the zero-crossing indication signal $Z_k$ would be a very stable waveform; thus, it is feasible to take the 30 electrical degrees delay thereof as the zero-crossing indication signal $Z_k$. In practice however, a motor unlikely spins at a constant rotation speed and the real load of a motor is varied, therefore, a motor system requires a method to delay the zero-crossing indication signal $Z_k$ by 30 electrical degrees to facilitate a commutation control of the motor.

Referring to FIG. 22, the FIG. 22 further schematically illustrates accumulation values $P_1$-$P_4$ in addition to the above-mentioned commutation-indicating signal $C_k$ and zero-crossing indication signal $Z_k$. The $P_1$-$P_4$ are served as variable parameters for repeatedly accumulating a default accumulation value in a duration of 1.5 cycle of the zero-crossing indication signal $Z_k$. In each period of time $\gamma_{i1}$-$\gamma_{i3}$, the curve of the accumulation value $P_1$ has a different slop value. In the period of time $\gamma_{i1}$, the slop value of the accumulation values $P_1$ is less, which indicates the accumulated amount represented by the parameter $P_1$ is less; in the period of time $\gamma_{i3}$, the slop value of the accumulation values $P_1$ is greater, which indicates the accumulated amount represented by the parameter $P_1$ is greater as well. In the period of time $\gamma_d$, a negative value is repeatedly accumulated to the maximum P1 obtained in the previous period of time, thus, the accumulation values $P_1$ is decreased to zero, where the commutation-indicating signal $C_k$ changes the signal state thereof.

The above-mentioned each of the periods of time $\gamma_{i1}$-$\gamma_{i3}$ and $\gamma_d$ respectively represents a phase difference of 60 electrical degrees. In the idea case, it is preferred that the commutation-indicating signal $C_k$ should be changed the signal state thereof in middle of each of the periods of time $\gamma_{i1}$-$\gamma_{i3}$ and $\gamma_d$. However, in practice, each of the periods of time $\gamma_{i1}$-$\gamma_{i3}$ and $\gamma_d$ is not the same, because the motor speed would be somewhat varied due to a varied load or an external factor. The time point to change the signal state of the commutation-indicating signal $C_k$ is closely related to the zero-crossing indication signal $Z_k$ prior to the time point. In terms of the commutation-indicating signal $C_k$ in $\gamma_d$ duration, the time length of $\gamma_{i3}$ is most related one; the next related one is the time length of $\gamma_{i2}$ and the least related one is the time length of $\gamma_{i1}$. Since the speed variation of a motor is related to the duty cycle of the zero-crossing indication signal $Z_k$, in addition, the speed of a motor is unlikely to be instantly changed; for example, if a motor accelerates in the time of $\gamma_{i1}$-$\gamma_d$, the time length $\gamma_{i1}$ would be longer and the time length $\gamma_{i3}$ would be shorter, and the time length $\gamma_d$ would be theoretically shorter than the time length $\gamma_{i3}$. Thus, the commutation-indicating signal $C_k$ in the duration Yd is most related to $\gamma_{i3}$, then $\gamma_{i2}$ and finally $\gamma_{i1}$.

In the present embodiment, a counter circuit in a higher frequency is employed, wherein the clock signal of the counter circuit is used to conduct the accumulation processing, that is to say, each clock pulse triggers an accumulation operation. Corresponding to each clock pulse, in the $\gamma_{i1}$ duration, x is added to the accumulation value $P_1$ (for example, x=1, which represents a lighter weight value); in the $\gamma_{i2}$ duration, y is added to the accumulation value $P_1$ (for example, y=2, which represents a general weight value); in the $\gamma_{i3}$ duration, z is added to the accumulation value $P_1$ (for example, z=3, which represents a heavier weight value); in the $\gamma_d$ duration, −m is added to the accumulation value $P_1$, wherein m=(x+y+z)×2 (for example, m=12, which is obtained by calculating the above-mentioned weight values). Whenever the accumulation value $P_1$ is decreased to zero by the subtractions, it indicates the signal state of the commutation-indicating signal $C_k$ is switched and a commutation at 30 electrical degrees is targeted.

The most advantageous point of the above-described scheme is no need of the conventional scheme using memories provided by the patent [10]. Instead, the present embodiment merely uses four counter circuits for the operations of the accumulation values $P_1$-$P_4$ to achieve the goal of a motor commutation exactly at 30 electrical degrees. In comparison with the patent [10], the present invention is overwhelming in cost-saving. It is noted, the described scheme reflects an embodiment of the present invention only. One skilled in the art should be able to utilize the embodiment by a modification. For example, a scheme configured with two durations, not the above-described four durations, still functions except an accuracy of commutation-indicating signal $C_k$ lower that the above-mentioned embodiment. In addition, one skilled in the art should understand that the embodiment can be implemented by using $Z_{on}$ or $Z_{off}$ instead of zero-crossing indication signal $Z_k$, to which the present invention does not limit.

The scheme of the embodiment of FIG. 22 can be summarized in following steps to brief the spirit of the present invention: first, i pieces of zero-crossing time prior to a state transition of the commutation-indicating signal $C_k$ are calculated, wherein the definition of zero-crossing time includes the following (1) or (2): (1) a time interval between a state transition of the zero-crossing indication signal $Z_k$ from a first state to a second state and a state transition of the zero-crossing indication signal $Z_k$ from the second state to the first state; (2) a time interval between a state transition of the zero-crossing indication signal $Z_k$ from the second state to the first state and a state transition of the zero-crossing indication signal $Z_k$ from the first state to the second state, wherein the k-th zero-crossing time is represented by $T_k$, i and k are natural number and $0<k\leqq i$. Next, each zero-crossing time is assigned with a weight value and the weight value of the k-th zero-crossing time is represented by $G_k$. Then, a delay time $T_d$ is defined by $$T_d=(G_1\times T_1+\ldots+G_k\times T_k+\ldots+G_i\times T_i)/(2\times(G_1+\ldots+G_i))$$

Further, in the delay time after the first zero-crossing time, the commutation-indicating signal $C_k$ transits the state thereof.

Figure 21:
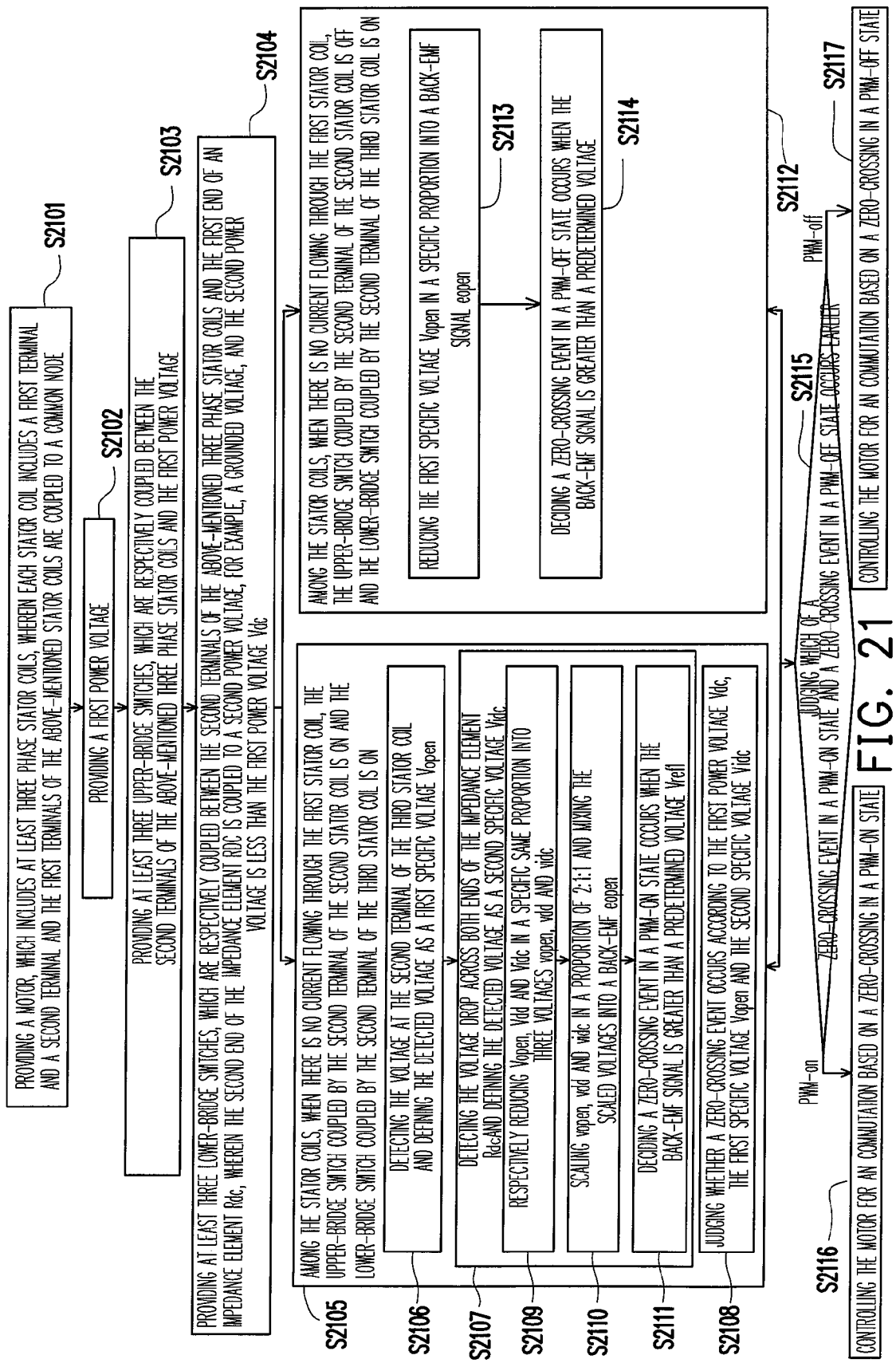
FIG. 21 is a flowchart of the method for controlling a motor according to the embodiment of the present invention.

Although the above-described embodiment provides a circuit for controlling a motor and a motor system, but the present invention is not limited by the above-described circuitries. Accordingly, the present invention further provides an embodiment of the method for controlling a motor. FIG. 21 is a flowchart of the method for controlling a motor according to the embodiment of the present invention. Referring to FIG. 21, first, a motor is provided, which includes at least three phase stator coils, wherein each stator coil includes a first terminal and a second terminal and the first terminals of the above-mentioned stator coils are coupled to a common node (step S2101). A first power voltage is provided (step S2102), which is represented by, for example, $V_{dc}$ of the above-mentioned embodiment. At least three upper-bridge switches are provided, which are respectively coupled between the second terminals of the above-mentioned three phase stator coils and the first power voltage (step S2103).

At least three lower-bridge switches are provided, which are respectively coupled between the second terminals of the above-mentioned three phase stator coils and the first end of an impedance element $R_{DC}$, wherein the second end of the impedance element $R_{DC}$ is coupled to a second power voltage, for example, a grounded voltage, and the second power voltage is less than the first power voltage $V_{dc}$ (step S2104). Then, among the stator coils, when there is no current flowing through the first stator coil, the upper-bridge switch coupled by the second terminal of the second stator coil is turned on and the lower-bridge switch coupled by the second terminal of the third stator coil is turned on, i.e., when two phases are conducted, while the other phase is in a PWM-on state, the flowchart comes to a new step (step S2105), which includes at least following three sub-steps: detecting the voltage at the second terminal of the third stator coil and defining the detected voltage as a first specific voltage $V_{open}$ (step S2106); detecting the voltage drop across both ends of the impedance element $R_{DC}$ and defining the detected voltage as a second specific voltage $V_{idc}$ (step S2107); judging whether a zero-crossing event occurs according to the first power voltage $V_{dc}$, the first specific voltage $V_{open}$ and the second specific voltage $V_{idc}$ (step S2108).

According to the circuitry of the above-described preferred embodiment and the mathematic equations, the step S2107 further includes following three sub-steps: respectively reducing $V_{open}$, $V_{dd}$ and $V_{idc}$ in a specific same proportion into three voltages $v_{open}$, $v_{dd}$ and $v_{idc}$ (step S2109); scaling $v_{open}$, $v_{dd}$ and $v_{idc}$ in a proportion of 2:1:1 and mixing the scaled voltages into a back-EMF $e_{open}$ (step S2110); deciding a zero-crossing event in a PWM-on state occurs when the back-EMF signal is greater than a predetermined voltage $V_{ref1}$ (step S2111).

In addition, among the stator coils, when there is no current flowing through the first stator coil, the upper-bridge switch coupled by the second terminal of the second stator coil is turned off and the lower-bridge switch coupled by the second terminal of the third stator coil is turned on, i.e., when two phases are conducted, while the other phase is in a PWM-off state, the flowchart comes to a new step (step S2112), which includes at least following five sub-steps: reducing the first specific voltage $V_{open}$ in a specific proportion into a back-EMF signal $e_{open}$ (step S2113); deciding a zero-crossing event in a PWM-off state occurs when the back-EMF signal is greater than a predetermined voltage (step S2114); judging which of a zero-crossing event in a PWM-on state and a zero-crossing event in a PWM-off state occurs earlier (step S2115); controlling the motor for an commutation based on a zero-crossing in a PWM-on state when the zero-crossing event in a PWM-on state occurs earlier (step S2116); controlling the motor for an commutation based on a zero-crossing in a PWM-off state when the zero-crossing event in a PWM-off state occurs earlier (step S2117).

In summary, since in the present invention, among the above-mentioned three-phase coils, when a current flows from the second terminal of the second specific coil to the second terminal of the third specific coil and there is no current in the first specific coil, the voltage at the second terminal of the first coil is detected as a first specific voltage and the voltage drop across a DC sensing resistor is detected as a second specific voltage; then, the first specific voltage, the second specific voltage and a DC voltage supplied to the motor are used to estimate zero-crossing points to control the motor, therefore, no filter, indicated by the prior art, is required, and the scheme provided by the present invention does not cause a problem that a phase delay occurs accompanied with detecting a zero-crossing. Furthermore, the circuitry provided by the embodiment of the present invention is able to detect zero-crossing points in a PWM-on state or in a PWM-off state by detecting no-excited stator coils.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling a motor, comprising:
providing a motor, wherein the motor comprises at least three phase stator coils, each stator coil comprises a first terminal and a second terminal and the first terminals of the stator coils are coupled to a common node;
providing a first power voltage;
providing at least three upper-bridge switches, wherein each upper-bridge switch is respectively coupled between one of the second terminals of the above-mentioned three phase stator coils and the first power voltage;
providing at least three lower-bridge switches, wherein each lower-bridge switch is respectively coupled between one of the second terminals of the above-mentioned three phase stator coils and the first end of an impedance element, wherein the second end of the impedance element is coupled to a second power voltage and the second power voltage is less than the first power voltage;
among the stator coils, when there is no current flowing through a first stator coil, the upper-bridge switch coupled by the second terminal of the second stator coil is turned on and the lower-bridge switch coupled by the second terminal of the third stator coil is turned on:
  detecting the voltage at the second terminal of the first stator coil and defining the detected voltage as a first specific voltage;
  detecting the voltage drop across both ends of the impedance element and defining the detected voltage as a second specific voltage;
  judging whether a zero-crossing occurs by using the first power voltage, the first specific voltage and the second specific voltage;
among the stator coils, when there is no current flowing through the first stator coil, the upper-bridge switch coupled by the second terminal of the second stator coil is turned off and the lower-bridge switch coupled by the second terminal of the third stator coil is turned on; and
performing a proportion operation on the first specific voltage to judge whether a second zero-crossing occurs.

2. The method for controlling a motor according to claim 1, wherein when the first power voltage is represented by $V_{dd}$, the first specific voltage is represented by $V_{open}$ and the second specific voltage is represented by $V_{idc}$, then, the step 'judging whether a zero-crossing occurs by using the first power voltage, the first specific voltage and the second specific voltage' comprises:
respectively reducing $V_{open}$, $V_{dd}$ and $V_{idc}$ in a specific proportion into three voltages $V_{open}$, $V_{dd}$ and $V_{idc}$;
scaling $V_{open}$, $V_{dd}$ and $V_{idc}$ in a proportion of 2:1:1 and mixing the scaled voltages into a back electromotive force signal; and
deciding the first zero-crossing occurs when the back electromotive force signal is greater than a predetermined voltage.

3. The method for controlling a motor according to claim 1, wherein the step 'performing a proportion operation on the first specific voltage to judge whether a second zero-crossing occurs' comprises:
reducing the first specific voltage in a specific proportion into a back electromotive force signal; and
deciding the second zero-crossing occurs when the back electromotive force signal is greater than a predetermined voltage.

4. The method for controlling a motor according to claim 1, further comprising following steps:
- judging which of the first zero-crossing and the second zero-crossing occurs earlier; and
- among the first zero-crossing and the second zero-crossing, selecting the earlier occurred zero-crossing and using the selected zero-crossing to control the motor for commutation.

5. A circuit for controlling a motor, wherein the motor comprises at least three phase stator coils, each stator coil comprises a first terminal and a second terminal, the first terminals of all the stator coils are coupled to a common node, the second terminal of each of the stator coils is coupled to at least an upper-bridge switch and at least a lower-bridge switch, each of the upper-bridge switches respectively determines whether a power voltage is supplied to one of the stator coils and each lower-bridge switch is coupled to a common voltage via an impedance element; circuit for controlling a motor comprising:
- a selection circuit, coupled to the second terminals of the stator coils, wherein when the upper-bridge switches or lower-bridge switches coupled by the second terminals of the first phase coil and the second phase coil are switched according to a pulse-width-modulation (PWM) signal, the voltage at the second terminal of the third phase coil is taken as a first voltage and coupled to the output terminal of the selection circuit;
- a zero-crossing detection unit, coupled to the output terminal of the selection circuit, wherein when the upper-bridge switch coupled by the second terminal of the first phase coil is turned on and the lower-bridge switch thereof is turned off, the power voltage and the voltage across the impedance element in the first voltage are removed to obtain a first back electromotive force voltage, the first back electromotive force voltage is compared with a first reference voltage and a first zero-crossing judgement signal is output, the zero-crossing detection unit comprising:
  - a first zero-crossing detection circuit, for removing the power voltage and the voltage across the impedance element in the first voltage to obtain the first back electromotive force voltage, comparing the back electromotive force voltage with the first reference voltage, and outputting the first zero-crossing judgement signal when the upper-bridge switch coupled by the second terminal of the first phase coil is turned on and the lower-bridge switch thereof is turned off; and
  - a second zero-crossing detection circuit, for taking the first voltage as a second back electromotive force voltage, comparing the second back electromotive force voltage with a second reference voltage, and outputting a second zero-crossing judgement signal when the upper-bridge switch coupled by the second terminal of the first phase coil is turned off; and
- a control circuit, for judging when a zero-crossing occurs according to the first zero-crossing judgement signal so as to control the motor.

6. The circuit for controlling a motor according to claim 5, wherein the selection circuit comprises a first proportionally voltages-reducing circuit for reducing the voltage at the second terminal of the third stator coil in a predetermined proportion to obtain the first voltage, and the first zero-crossing detection circuit comprises:
- a second proportionally voltages-reducing circuit, for reducing the power voltage in the predetermined proportion, defining the reduced power voltage as a second voltage, reducing the voltage across the impedance element in the predetermined proportion and defining the reduced voltage as a third voltage; and
- an analog differential amplifier, for scaling the first voltage, the second voltage and the third voltage in a proportion of 2:1:1, subtracting the scaled second voltage and the scaled third voltage from the scaled first voltage, amplifying the scaled first voltage after the above-mentioned subtraction operations to obtain the first back electromotive force voltage and outputting the first back electromotive force voltage.

7. The circuit for controlling a motor according to claim 6, wherein the first zero-crossing detection circuit further comprises:
- a reference voltage generator, for generating the first reference voltage, wherein when the upper-bridge switch coupled by the second terminal of the first phase coil is turned on, the lower-bridge switch thereof is turned off, the lower-bridge switch of the second phase coil is turned on and there is a current flowing through the third phase coil from the first terminal to the second terminal thereof, then, the first reference voltage is set to be a higher voltage level; when the level of the first back electromotive force voltage is lower than the higher voltage level, the first reference voltage is set to be a middle voltage level; when the level of the first sampling circuit back electromotive force voltage is higher than the middle voltage level, the first reference voltage is set to be a lower voltage level;
- a comparator, comprising a positive input terminal, a negative input terminal and an output terminal, wherein the positive input terminal receives the first back electromotive force voltage, the negative input terminal receives the first reference voltage and the output terminal outputs a comparison voltage; and
- a sampling circuit, coupled to the output terminal of the comparator to receive the comparison voltage for sampling the comparison voltage to obtain the first zero-crossing judgement signal when the upper-bridge switch of the first stator coil is turned on.

8. The circuit for controlling a motor according to claim 6, wherein the first zero-crossing detection circuit further comprises:
- a reference voltage generator, for generating the first reference voltage, wherein when the upper-bridge switch coupled by the second terminal of the first phase coil is turned on, the lower-bridge switch thereof is turned off, the lower-bridge switch of the second phase coil is turned on and there is a current flowing through the third phase coil from the second terminal to the first terminal thereof, then, the first reference voltage is set to be a lower voltage level; when the level of the first back electromotive force voltage is higher than the higher voltage level, the first reference voltage is set to be a middle voltage level; when the level of the first sampling circuit back electromotive force voltage is lower than the middle voltage level, the first reference voltage is set to be a higher voltage level;
- a comparator, comprising a positive input terminal, a negative input terminal and an output terminal, wherein the positive input terminal receives the first back electromotive force voltage, the negative input terminal receives the first reference voltage and the output terminal outputs a comparison voltage; and
- a sampling circuit, coupled to the output terminal of the comparator to receive the comparison voltage for sampling the comparison voltage to obtain the first zero-crossing judgement signal when the upper-bridge switch of the first stator coil is turned on.

9. The circuit for controlling a motor according to claim 5, wherein the second zero-crossing detection circuit further comprises:
a comparator, comprising a positive input terminal, a negative input terminal and an output terminal, wherein the positive input terminal receives the second back electromotive force voltage, the negative input terminal receives the second reference voltage and the output terminal outputs a comparison voltage; and
a sampling circuit, coupled to the output terminal of the comparator to receive the comparison voltage for sampling the comparison voltage to obtain the second zero-crossing judgement signal when the upper-bridge switch of the first stator coil is turned on.

10. The circuit for controlling a motor according to claim 5, wherein the control circuit receives the first zero-crossing judgement signal and the second zero-crossing judgement signal to obtain a zero-crossing indication signal and outputs a commutation-indicating signal according to the zero-crossing indication signal, wherein the commutation-indicating signal transits the state thereof according to the following rule:
calculating i pieces of zero-crossing time prior to a state transition of the commutation-indicating signal, wherein the definition of the plurality of zero-crossing time comprises the following (1) or (2): (1) a time interval between a state transition of the zero-crossing indication signal from a first state to a second state and a state transition of the zero-crossing indication signal from the second state to the first state; (2) a time interval between a state transition of the zero-crossing indication signal from the second state to the first state and a state transition of the zero-crossing indication signal from the first state to the second state, wherein the k-th zero-crossing time is represented by $T_k$, i and k are natural number and $0<k<i$;
assigning each zero-crossing time with a weight value and the weight value of the k-th zero-crossing time is represented by $G_k$;
defining a delay time $T_d$ with $$T_d=(G_1 \times T_1 + \ldots + G_k \times T_k + \ldots + G_i \times T_i)/(2 \times (G_1 + \ldots + G_i));\text{ and}$$

transiting the state of the commutation-indicating signal in the delay time after the first zero-crossing time.

11. A brushless motor system, comprising:
a motor, comprising at least three phase stator coils, wherein each stator coil comprises a first terminal and a second terminal, and the first terminals of all the stator coils are coupled to a common node;
a plurality of upper-bridge switches, wherein at least one of the upper-bridge switches is coupled between the second terminal of each stator coil and a power voltage and each upper-bridge switch respectively decides whether a power voltage is supplied to the stator coils;
an impedance element, wherein the first terminal of the impedance element is coupled to a common node voltage;
a plurality of lower-bridge switches, wherein at least one of the lower-bridge switches is coupled between the second terminal of each stator coil and the second terminal of the impedance element;
a selection circuit, coupled to the second terminals of the stator coils, wherein when the upper-bridge switches or lower-bridge switches coupled by the second terminals of the first phase coil and the second phase coil are switched according to a PWM signal, the voltage at the second terminal of the third phase coil is taken as a first voltage and coupled to the output terminal of the selection circuit;
a zero-crossing detection unit, coupled to the output terminal of the selection circuit, wherein when the upper-bridge switch coupled by the second terminal of the first phase coil is turned on and the lower-bridge switch thereof is turned off, the power voltage and the voltage across the impedance element in the first voltage are removed to obtain a first back electromotive force voltage, the first back electromotive force voltage is compared with a first reference voltage and a first zero-crossing judgement signal is output, the zero-crossing detection unit comprising:
a first zero-crossing detection circuit, for removing the power voltage and the voltage across the impedance element in the first voltage to obtain the first back electromotive force voltage, comparing the back electromotive force voltage with the first reference voltage, and outputting the first zero-crossing judgement signal when the upper-bridge switch coupled by the second terminal of the first phase coil is turned on and the lower-bridge switch thereof is turned off; and
a second zero-crossing detection circuit, for taking the first voltage as a second back electromotive force voltage, comparing the second back electromotive force voltage with a second reference voltage, and outputting a second zero-crossing judgement signal when the upper-bridge switch coupled by the second terminal of the first phase coil is turned off; and
a control circuit, for judging when a zero-crossing occurs according to the first zero-crossing judgement signal so as to control the motor.

12. The brushless motor system according to claim 11, wherein the selection circuit comprises a first proportionally voltages-reducing circuit for reducing the voltage at the second terminal of the third stator coil in a predetermined proportion to obtain the first voltage, and the first zero-crossing detection circuit comprises:
a second proportionally voltages-reducing circuit, for reducing the power voltage in the predetermined proportion, defining the reduced power voltage as a second voltage, reducing the voltage across the impedance element in the predetermined proportion and defining the reduced voltage as a third voltage; and
an analog differential amplifier, for scaling the first voltage, the second voltage and the third voltage in a proportion of 2:1:1, subtracting the scaled second voltage and the scaled third voltage from the scaled first voltage, amplifying the scaled first voltage after the above-mentioned subtraction operations to obtain the first back electromotive force voltage and outputting the first back electromotive force voltage.

13. The brushless motor system according to claim 12, wherein the first zero-crossing detection circuit further comprises:
a reference voltage generator, for generating the first reference voltage, wherein when the upper-bridge switch coupled by the second terminal of the first phase coil is turned on, the lower-bridge switch thereof is turned off, the lower-bridge switch of the second phase coil is turned on and there is a current flowing through the third phase coil from the first terminal to the second terminal thereof, then, the first reference voltage is set to be a higher voltage level; when the level of the first back electromotive force voltage is lower than the higher voltage level, the first reference voltage is set to be a middle voltage level; when the level of the first sampling circuit back electromotive force voltage is higher than the middle voltage level, the first reference voltage is set to be a lower voltage level;

a comparator, comprising a positive input terminal, a negative input terminal and an output terminal, wherein the positive input terminal receives the first back electromotive force voltage, the negative input terminal receives the first reference voltage and the output terminal outputs a comparison voltage; and a sampling circuit, coupled to the output terminal of the comparator to receive the comparison voltage for sampling the comparison voltage to obtain the first zero-crossing judgement signal when the upper-bridge switch of the first stator coil is turned on.

14. The brushless motor system according to claim 12, wherein the first zero-crossing detection circuit further comprises:

a reference voltage generator, for generating the first reference voltage, wherein when the upper-bridge switch coupled by the second terminal of the first phase coil is turned on, the lower-bridge switch thereof is turned off, the lower-bridge switch of the second phase coil is turned on and there is a current flowing through the third phase coil from the second terminal to the first terminal thereof, then, the first reference voltage is set to be a lower voltage level; when the level of the first back electromotive force voltage is higher than the higher voltage level, the first reference voltage is set to be a middle voltage level; when the level of the first sampling circuit back electromotive force voltage is lower than the middle voltage level, the first reference voltage is set to be a higher voltage level;

a comparator, comprising a positive input terminal, a negative input terminal and an output terminal, wherein the positive input terminal receives the first back electromotive force voltage, the negative input terminal receives the first reference voltage and the output terminal outputs a comparison voltage; and a sampling circuit, coupled to the output terminal of the comparator to receive the comparison voltage for sampling the comparison voltage to obtain the first zero-crossing judgement signal when the upper-bridge switch of the first stator coil is turned on.

15. The brushless motor system according to claim 11, wherein the second zero-crossing detection circuit further comprises:

a comparator, comprising a positive input terminal, a negative input terminal and an output terminal, wherein the positive input terminal receives the second back electromotive force voltage, the negative input terminal receives the second reference voltage and the output terminal outputs a comparison voltage; and a sampling circuit, coupled to the output terminal of the comparator to receive the comparison voltage for sampling the comparison voltage to obtain the second zero-crossing judgement signal when the upper-bridge switch of the first stator coil is turned on.

16. The brushless motor system according to claim 11, wherein the control circuit receives the first zero-crossing judgement signal and the second zero-crossing judgement signal to obtain a zero-crossing indication signal and outputs a commutation-indicating signal according to the zero-crossing indication signal, wherein the commutation-indicating signal transits the state thereof according to the following rule:

calculating i pieces of zero-crossing time prior to a state transition of the commutation-indicating signal, wherein the definition of the plurality of zero-crossing time comprises the following (1) or (2): (1) a time interval between a state transition of the zero-crossing indication signal from a first state to a second state and a state transition of the zero-crossing indication signal from the second state to the first state; (2) a time interval between a state transition of the zero-crossing indication signal from the second state to the first state and a state transition of the zero-crossing indication signal from the first state to the second state, wherein the k-th zero-crossing time is represented by $T_k$, i and k are natural number and $0<k \leq i$;

assigning each zero-crossing time with a weight value and the weight value of the k-th zero-crossing time is represented by $G_k$;

defining a delay time $T_d$ with $$T_d = (G_1 \times T_1 + \ldots + G_k \times T_k + \ldots + G_i \times T_i)/(2 \times (G_1 + \ldots + G_i)); \text{ and}$$

transiting the state of the commutation-indicating signal in the delay time after the first zero-crossing time.

17. A method for controlling a motor, comprising:

providing a zero-crossing indication signal and a commutation-indicating signal;

calculating i pieces of zero-crossing time prior to a state transition of the commutation-indicating signal, wherein the definition of the plurality of zero-crossing time comprises the following (1) or (2): (1) a time interval between a state transition of the zero-crossing indication signal from a first state to a second state and a state transition of the zero-crossing indication signal from the second state to the first state; (2) a time interval between a state transition of the zero-crossing indication signal from the second state to the first state and a state transition of the zero-crossing indication signal from the first state to the second state, wherein the k-th zero-crossing time is represented by $T_k$, i and k are natural number and $0<k \leq i$;

assigning each zero-crossing time with a weight value and the weight value of the k-th zero-crossing time is represented by $G_k$;

defining a delay time $T_d$ with $$T_d = (G_1 \times T_1 + \ldots + G_k \times T_k + \ldots + G_i \times T_i)/(2 \times (G_1 + \ldots + G_i)); \text{ and}$$

transiting the state of the commutation-indicating signal in the delay time after the first zero-crossing time.

* * * * *